United States Patent [19]

Iritani et al.

[11] Patent Number: 5,526,650

[45] Date of Patent: Jun. 18, 1996

[54] AIR-CONDITIONING APPARATUS

[75] Inventors: Kunio Iritani, Anjo; Takahisa Suzuki, Kariya; Akira Isaji, Nishio, all of Japan

[73] Assignee: Nippondenso Co., Ltd., Kariya, Japan

[21] Appl. No.: 308,929

[22] Filed: Sep. 20, 1994

[30] Foreign Application Priority Data

Sep. 21, 1993 [JP] Japan .................................. 5-234550
Apr. 21, 1994 [JP] Japan .................................. 6-082875
May 23, 1994 [JP] Japan .................................. 6-108142

[51] Int. Cl.$^6$ .............................. F25D 17/02; F25B 41/04
[52] U.S. Cl. .................................................. 62/205; 62/90
[58] Field of Search ............................ 62/160, 90, 324.6, 62/173, 205

[56] References Cited

U.S. PATENT DOCUMENTS

| 3,738,117 | 6/1973  | Engel        | 62/90 X |
| 3,798,920 | 3/1974  | Morgan       | 62/173  |
| 4,920,756 | 5/1990  | Howland et al. | 62/90 X |
| 5,052,189 | 10/1991 | Akiike       | 62/197  |
| 5,299,431 | 4/1994  | Iritani et al. | 62/243  |

FOREIGN PATENT DOCUMENTS

| 4151324 | 5/1992  | Japan ........................................... 62/90 |
| 5229333 | 9/1993  | Japan . |
| 5319070 | 12/1993 | Japan . |
| 5319077 | 12/1993 | Japan . |

OTHER PUBLICATIONS

Patent Abstract of Japan, vol. 17, No. 645 (M–1517) Aug. 1993 re JP–A 5203274.

*Primary Examiner*—William E. Wayner
*Attorney, Agent, or Firm*—Cushman, Darby & Cushman

[57] ABSTRACT

An air-conditioning apparatus that prevents a state of blowing temperature fluctuation due to magnitude of vehicle speed in a dehumidification mode. A condenser and evaporator are disposed within an air duct, and an exterior heat exchanger is disposed externally. A capillary and check valve are provided in a refrigerant passage between the condenser and exterior heat exchanger, and a capillary is provided in a refrigerant passage between the exterior heat exchanger and evaporator. During dehumidification mode, a four-way switching valve is switched so that the flow passage of refrigerant is from the condenser to the capillary, to the check valve, to the exterior heat exchanger, to the capillary, to the evaporator, and then to an accumulator. In this case, the condenser and exterior heat exchanger function as a refrigerant condenser in a series-connected state, but because in actuality the capillary is provided, the majority of refrigerant discharged from a compressor is condensed by the condenser.

5 Claims, 20 Drawing Sheets

FIG. 3

| MODE OF REFRIGERANT CYCLE 55 | INPUT | | OUTPUT |
|---|---|---|---|
| | COMPRESSOR | OUTPUT DATE OF EACH SENSOR | MODE OF OUTSIDE FAN 89 |
| COOLING | ON | Tam $\;\overset{22\;\;25}{\longleftrightarrow}\;$ (°C) | Hi / Lo |
| HEATING | ON | Tam $\;\overset{13\;\;16}{\longleftrightarrow}\;$ (°C) | Hi / Lo |
| DEHUMIDIFING | ON | Pd $\;\overset{17\;\;18}{\longleftrightarrow}\;$ (kgf/cm²G)  Td $\;\overset{109\;\;110}{\longleftrightarrow}\;$ (°C) | Hi / Lo / OFF |

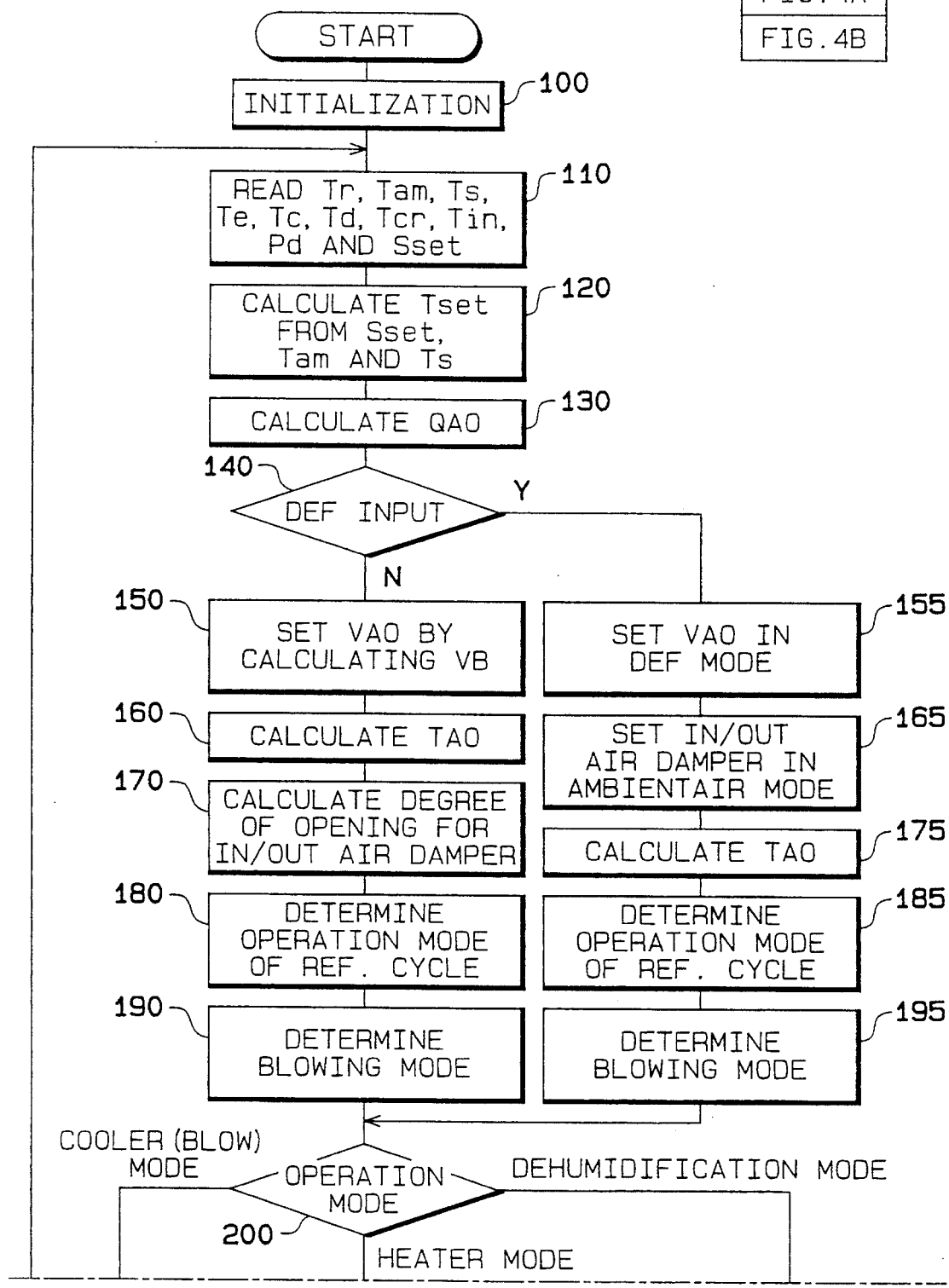

ST1
VALVE STROKE

VALVE STROKE

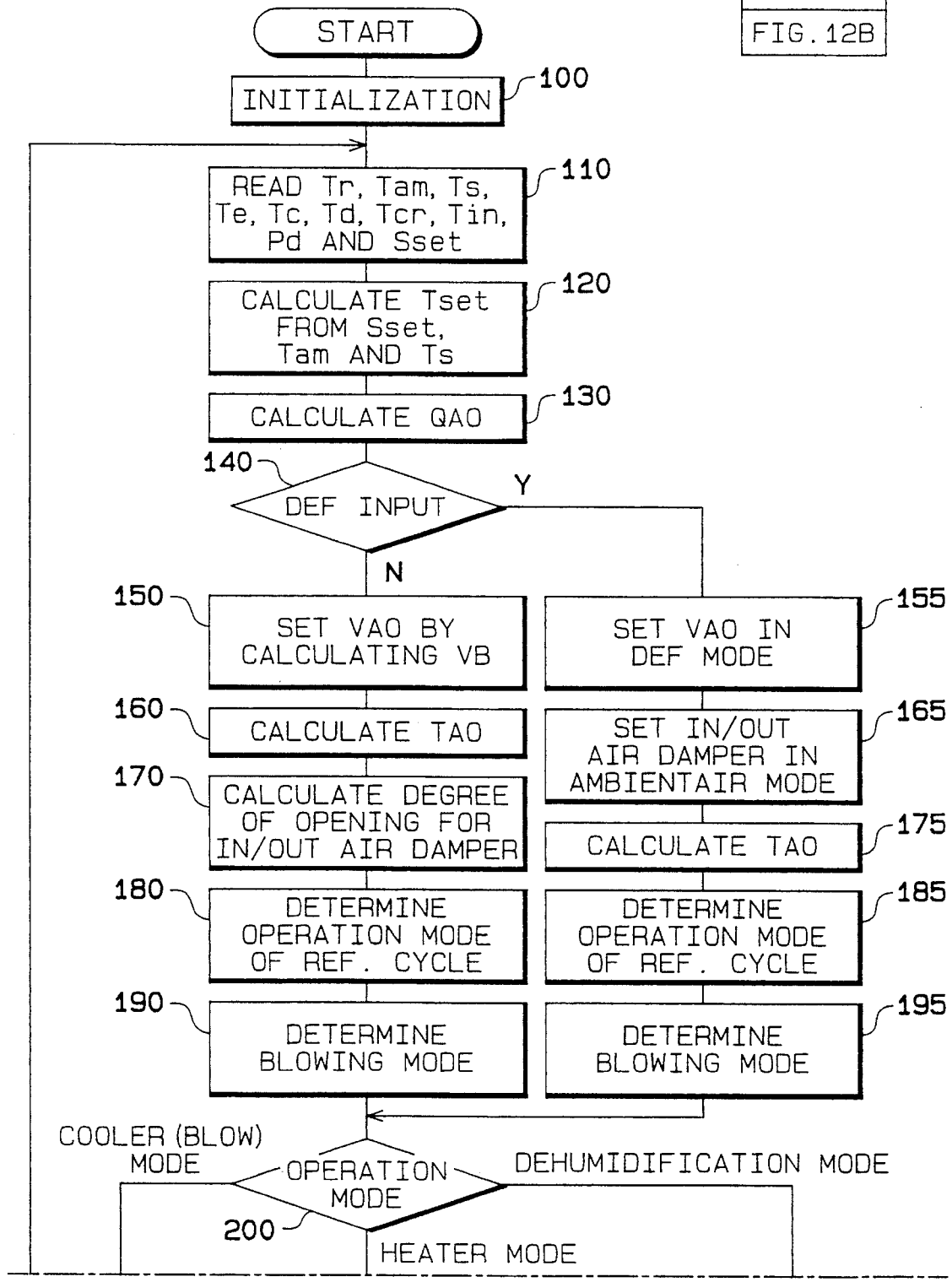

| | VALVE OPENING FOR HEATING | VALVE OPENING FOR COOLING |
|---|---|---|
| RANK 1 | A | D |
| RANK 2 | A | C |
| RANK 3 | B | C |
| RANK 4 | C | C |
| RANK 5 | D | C |

DOWN ↑↓ UP

AIR-CONDITIONING APPARATUS

CROSS REFERENCE TO RELATED APPLICATION

This application claims the benefit of priority of the prior Japanese patent applications No. 5-234550, 6-82875 and 6-108142 filed on Sep. 21, 1993, Apr. 21, 1994 and May 23, 1994 respectively, the contents of which are incorporated herein by reference.

BACKGROUND OF THE INVENTION

1. Field of the Invention

This invention relates to an air-conditioning apparatus with an improved operation control system when operating in a dehumidification mode.

2. Description of the Related Art

As an air-conditioning apparatus mounted on, for example an electrical vehicle, in recent years there have been items which employ a refrigeration cycle which doubles in use as a heat pump. Such devices are intended to switch a heater-cooler unit by means of switching, using a valve, a circulation path of refrigerant.

In order to perform dehumidification from a heater-cooler unit with a refrigeration cycle that doubles in use as heat pump, as disclosed in Japanese Patent Application No. 4-107027, which was published Dec. 3, 1993 under No. 5-319077 it has been proposed that a condenser be positioned in an air-conditioning apparatus evaporator within an air duct as well as disposing an exterior heat exchanger outside the air duct. This condenser, exterior heat exchanger, and evaporator are provided in a refrigerant circulation circuit, and by switching a valve provided in this refrigerant circulation circuit and switching the circulation circuit for the refrigerant, the device is changed from a heater to an air-conditioner to a dehumidification device. The operation mode is changed as follows: in the cooling mode, refrigerant discharged from the compressor flows from the exterior heat exchanger to the evaporator and is returned to the compressor, and the exterior heat exchanger functions as an "exterior condenser." In the heater mode, refrigerant discharged from the compressor flows from the condenser to the to the exterior heat exchanger and is returned to the compressor, and the exterior heat exchanger functions as an "exterior evaporator." Further, in the dehumidification mode, refrigerant discharged from the compressor flows from the condenser to the evaporator via the exterior heat exchanger, and air dehumidified and chilled by the evaporator is heated to the target blowing temperature by the condenser and is blown into the passenger compartment.

In order to control the blowing temperature during cooler, heater, or dehumidification modes in such an air-conditioning apparatus, an exterior fan which forces air toward the exterior heat exchanger is provided. The fan varies the heat-exchanging capacity (heat-absorbing or heat-radiating capacity) of the exterior heat exchanger by switching the revolving speed of this exterior fan, thus affecting the heat-radiating capacity of the condenser and the heat-absorbing capacity of the evaporator.

In the case where an air-conditioning apparatus such as that described above is installed in a vehicle such as a van, because of the relationship whereby the exterior heat exchanger is installed horizontally on the bottom surface of the vehicle body, effects due to vehicle-speed wind (wind received in accordance with vehicle travel) with respect to the heat-exchanging capacity of the exterior heat exchanger are hardly exerted. For this reason it is possible to actively control the heat-exchanging capacity of the exterior heat exchanger by means of switching the revolving speed of an exterior fan.

In contrast to this, in the case where the foregoing exterior heat exchanger was installed in a location receiving vehicle speed wind from the front grille, as is the case when mounted on an ordinary vehicle—i.e., a vehicle with a structure that takes in vehicle speed wind from the front grille—the heat-exchanging capacity of the exterior heat exchanger fluctuated in accordance with the magnitude of vehicle speed. Thus, the following problem arose with the prior art.

Briefly, in the cooler mode and the heater mode, the temperature of the evaporator working as a heat exchanger for the cooler and the temperature of the condenser working as a heat exchanger for the heater in the respective modes do not fluctuate greatly even in the case when the heat-exchanging capacity of the exterior heat exchanger has fluctuated, and so there is no large fluctuation in the temperature of the air conditioner air, and no impediment occurs in practical usage.

In the dehumidification mode, however, where the condenser acts as a reheating source for the air dehumidified and chilled by the evaporator, the condenser and exterior heat exchanger function as a refrigerant condenser in a series-connected state, and a phenomenon occurs wherein the temperature of the condenser fluctuates according to the magnitude of the vehicle speed. That is to say, in the case when vehicle speed is large, the heat-radiating performance of the foregoing condenser and exterior heat exchanger, and in its turn the condensation performance, rise and condensation pressure drops, and so the temperature of the condenser experiences a relative decline. Additionally, in the case when vehicle speed is small (including times when the vehicle is stopped), the condensation performance of the condenser and exterior heat exchanger fall and condensation pressure rises, and so the temperature of the condenser experiences a relative rise. Because of this, when in the dehumidification mode the blowing temperature dependent on the temperature of the condenser fluctuates in accordance with the magnitude of the vehicle speed, and there is the problem that comfortable air conditioning cannot be expected.

Additionally, there is the drawback that the adjustment range of the heat-exchanging capacity of the exterior heat exchanger obtained by means of switching the revolving speed of the exterior fan is not sufficient when seen from the temperature adjustment range of the blown air that is actually required, and the temperature adjustment range of the blown air is narrow.

SUMMARY OF THE INVENTION

In light of such circumstances, the present invention provides an air-conditioning apparatus which performs reliably even when dehumidification is selected. A heater-cooler unit, by means of a refrigeration cycle which doubles in use as heat pump. Furthermore, during dehumidification mode, it is possible to effectively prevent fluctuations in blowing temperature due to the magnitude of the vehicular speed. Rather, the dehumidification device performs constantly comfortable air-conditioning operation. This enables the expansion of the temperature adjustment range of the blown air during the dehumidification mode and can improve temperature controllability during the dehumidification mode, even in the case when mounted with respect to a vehicle in a state such that wind accompanying the travel thereof exerts an effect on the heat-radiating system of the foregoing refrigeration cycle.

In order to attain the foregoing object, an air-conditioning apparatus according to this invention provides, within a refrigerant circulation circuit, an evaporator disposed within an air duct, a condenser which functions as a heating source for air passing therethrough, and an exterior heat exchanger disposed outside the air duct. Furthermore, the present invention includes a first restrictor in a refrigerant passage between the condensers and the exterior heat exchangers, provides a second restrictor in a refrigerant passage between the exterior heat exchanger and the evaporator, and allowing an operation mode to be switched only with the cooler, heater, or dehumidification by using a switching a valve in the refrigerant circulation circuit to switch the circulation path of refrigerant, wherein during dehumidification mode refrigerant flows sequentially from the condenser through the first restrictor, the exterior heat exchanger, and the second restrictor to the evaporator. It is also possible to form both first restrictor and second restrictor by means of a fixed aperture.

In the present invention, during the dehumidification mode refrigerant discharged from the compressor flows sequentially from the condenser through the first restrictor, the exterior heat exchanger, and the second restrictor to the evaporator, and wind dehumidified and chilled by the evaporator is reheated up to the target blowing temperature by using the generated heat of the condenser. Wind is blown into the passenger compartment. In such a dehumidification mode, the condenser and exterior heat exchanger function as a refrigerant condenser in a series-connected state, but in actuality the First restrictor is provided between the condenser and the exterior heat exchanger, and so the majority of refrigerant discharged from the compressor is condensed by the condenser. Further, along with this, the condensation heat thereof is provided for heat exchange with the wind dehumidified and chilled by the evaporator. Consequently, because a state where refrigerant of comparatively low temperature flows into the exterior heat exchanger—in other words, a state wherein the difference between the temperature of refrigerant flowing into the exterior heat exchanger and the ambient air temperature has become small—the exterior heat exchanger can be considered as simply a pipe for refrigerant passage. As a result of the above, in the case where the air-conditioning apparatus is mounted on a vehicle, the temperature of the condenser during the dehumidification mode becomes resistant to fluctuations according to the magnitude of vehicle speed and the temperature of blown air after being reheated by means of the condenser is stabilized, even when the exterior heat exchanger is disposed in a state receiving wind accompanying travel of the vehicle.

BRIEF DESCRIPTION OF THE DRAWINGS

Other objects, features and characteristics of the present invention will be come apparent upon study of the following detailed description, the appended claims and the accompanying drawings, all of which from a part of this specification. In the drawings:

FIG. 3 is a diagram indicating the relationship between operation modes of a refrigeration cycle and operation modes of an exterior fan;

DETAILED DESCRIPTION OF THE PRESENTLY PREFERRED EXEMPLARY EMBODIMENT

Figure 1:
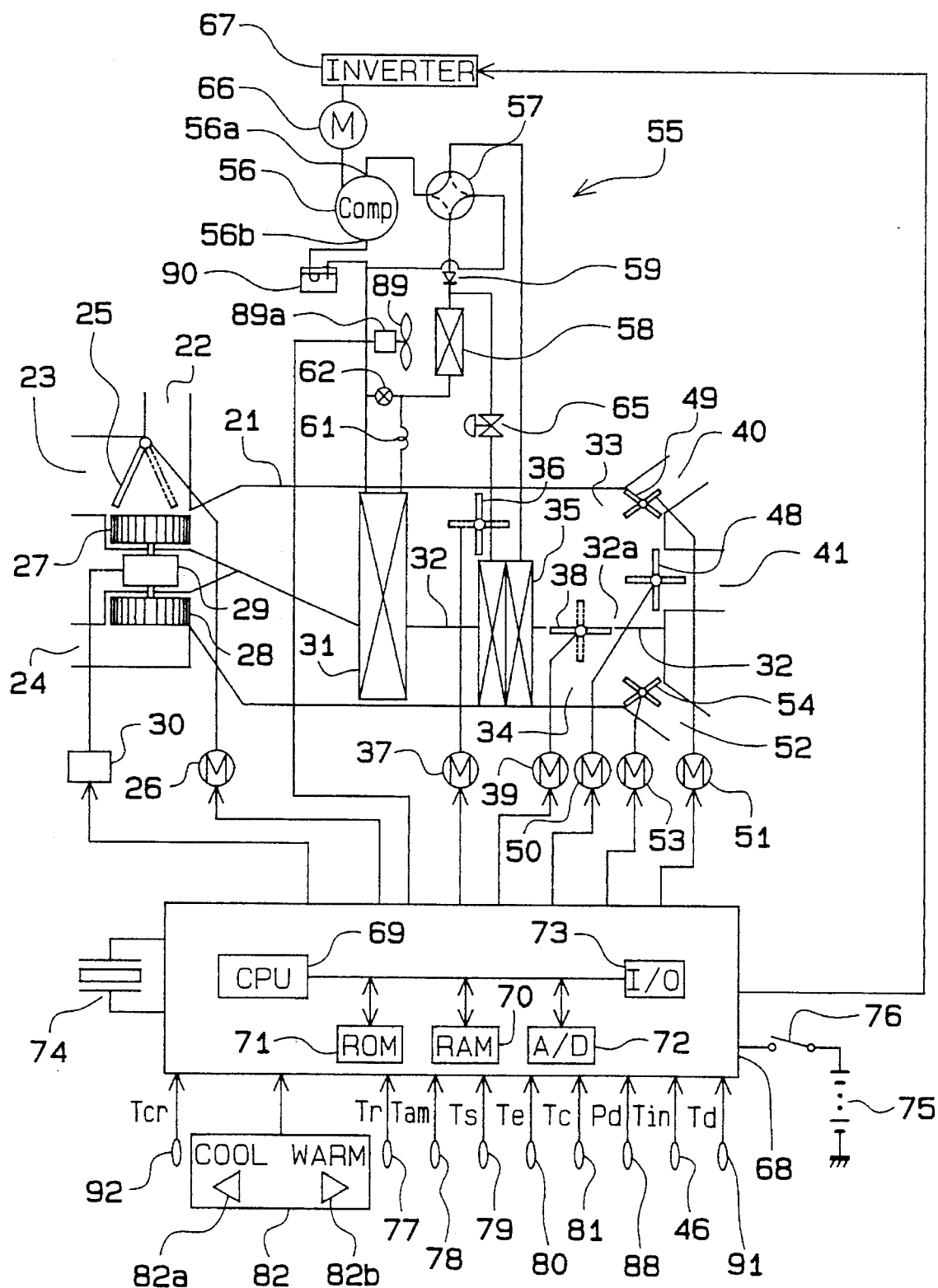
FIG. 1 is a structural schematic drawing indicating the entirety of an air-conditioning apparatus according to a first embodiment of this invention.

A first embodiment according to this invention implemented in an air-conditioning apparatus of an electric automobile will be described hereinafter with reference to FIGS. 1 to 10. The structural schematic of the entire air-conditioning apparatus will be described first with reference to FIG. 1.

Outer air intake port 22, which takes in air (outer air) from outside a passenger compartment, and two inner air intake ports 23 and 34 which take in air (inner air) within the passenger compartment are provided at the upstream side of air duct 21. Inner/outer air damper 25 is provided at an intermediate position between inner air intake port 23 and air intake port 22. By adjusting the degree of opening of inner/outer air damper 25 using a servomotor 26, the mix ratio of air taken in from outer air intake port 22 and inner air intake ports 23 and 24 can be varied to control the intake air temperature. On the downstream side of inner/outer air damper 25 and the downstream side of inner air intake port 24, blowers 27 and 28 are provided, with blowers 27 and 28 being installed on a rotating shaft of blower motor 29. Blower motor 29 is driven by a drive circuit 30.

Evaporator 31 is disposed on the downstream side of blowers 27 and 28, and the downstream side of evaporator 31 is partitioned into two air passages 33 and 34 (upper and lower) by partition plate 32. Condenser 35 is disposed in the lower air passage 34. The top of condenser 35 protrudes within upper air passage 33. Above condenser 35 is disposed strong-cooling damper 36, which is driven by servomotor 37. The amount of air bypassing condenser 35 can be varied using damper 36. Additionally, communicating damper 38 is disposed on communicating port 32a provided on the partition plate 32 downstream of the condenser 35. By means of driving this communicating damper 38 by a servomotor 39, the amount of air passing through communicating port 32a of the partition plate 32 can be varied, and air resistance during a single mode (for example FACE mode, DEF mode, etc.) is reduced.

DEF vent 40 and FACE vent 41 are provided on the downstream side of upper air passage 33. DEF vent 40 and FACE vent 41 are provided with respective dampers 48 and 49, and dampers 48 and 49 are driven by respective servomotors 50 and 51. FOOT vent 52 which blows air toward the feet of a passenger is provided on the downstream side of lower air passage 34. FOOT vent 52 also includes damper 54 driven by a servomotor 53.

The evaporator 31 and condenser 35 are the constituent elements of refrigeration cycle 55 which doubles in use as a heat pump. As shown in FIG. 1, a refrigerant circulation circuit of refrigeration cycle 55 is composed of a compressor 56, four-way switching valve 57, exterior heat exchanger 58, check valve 59, capillary 61, solenoid valve 62, electronic expansion valve 65, accumulator 90, evaporator 31, and condenser 35 connected by piping. Electronic expansion valve 65 is provided as a variable aperture (corresponding to the First restrictor according to this invention) in the refrigerant passage between condenser 35 and exterior heat exchanger 58. Electronic expansion valve is the same as electric expansion valve in general. In this specification, the term "electronic expansion valve" includes "electric expansion valve". Capillary 61 is provided as a fixed aperture (corresponding to the second restrictor according to this invention) in the refrigerant passage between exterior heat exchanger 58 and evaporator 31. Solenoid valve 62, electronic expansion valve 65, and four-way switching valve 57 are switched as shown in the following Table I according to the operation mode of the refrigeration cycle 55.

TABLE I

| Input Operation | Output | | |
|---|---|---|---|
| mode of refrigeration cycle 55 | Solenoid valve 62 | Electronic expansion valve 65 | Four-way switching valve 57 |
| OFF | OFF | Fully Open | OFF (solid line) |
| Cooler | OFF | Fully open | ON (dotted line) |
| Heater | ON | Desired Aperture opening | OFF (solid line) |
| Defrost | OFF | Fully open | OFF (solid line) |
| Dehumidify | OFF | Desired Aperture Opening | OFF (solid line) |

As this Table 1 makes clear, in the cooler mode solenoid valve 62 is switched off and electronic expansion valve 65 is opened fully, and four-way switching valve 57 is switched to the position indicated by dotted lines in FIG. 1 ("ON" position). Refrigerant discharged from discharge port 56a of compressor 56 circulates on a path from check valve 59 to exterior heat exchanger 58, to capillary 61, to evaporator 31, to accumulator 90, and then to intake port 56b of compressor 56. By means of such a circulation, high-temperature gas refrigerant discharged from discharge port 56a of compressor 56 radiates heat and is liquefied by the exterior heat exchanger 58, and this liquefied refrigerant is evaporated by evaporator 32, thereby chilling the air passing through evaporator 31.

In the heater mode, however, solenoid valve 62 is switched "ON" and four-way switching valve 57 is switched to the position indicated by solid lines in FIG. 1 ("OFF" position), and electronic expansion valve 65 is opened to a desired aperture opening. Refrigerant discharged from discharge port 56a of compressor 56 circulates on a path from condenser 35 to electronic expansion valve 65, to exterior heat exchanger 58, to solenoid valve 62, to accumulator 90, and then to intake port 56b of the compressor 56. By means of this, high-temperature gas refrigerant discharged from discharge port 56a of compressor 56 radiates heat and is liquefied by condenser 35, and air passing through condenser 35 is warmed by means of this heat radiation.

Additionally, in the defrost mode, solenoid valve 62 is switched "OFF" and electronic expansion value 65 is opened fully, four-way switching valve 57 is switched to the position indicated by solid lines in FIG. 1. High-temperature gas refrigerant discharged from discharge port 56a of compressor 56 passes through condenser 35 and electronic expansion valve 65 and is supplied also to exterior heat exchanger 58, and removes frost on the surface of exterior heat exchanger 58.

Also, in the dehumidification mode, solenoid valve 62 is switched "OFF" and four-way switching valve 57 is switched to the position indicated by solid lines in FIG. 1, and electronic expansion valve 65 is opened to a desired aperture opening. This allows the passage of refrigerant from condenser 35 to electronic expansion valve 65, to exterior heat exchanger 58, to capillary 61, and then to evaporator 31. Passage resistance in the refrigerant passage extending from condenser 35 to exterior heat exchanger 58 is switched as desired by means of electronic expansion valve 65.

In addition, an exterior fan for forced-cooling use is provided in the exterior heat exchanger 58. As shown in FIG.

3, a fan motor 89a of exterior fan 89 allows switching to high-speed revolution "HI," low-speed revolution "LO," and stopped "OFF" by means of the operation mode of the refrigeration cycle 55 and output data from various sensors to be described below. For example, in the cooling mode, at an ambient air temperature Tam, detected by means of ambient air temperature sensor 78, of 25° C. or more "HI" results, and at 22° C. or less "LO" results. In the heater mode, however, "HI" results at an ambient air temperature Tam of 13° C. or less and "LO" results at 16° C. or more. Additionally, in the dehumidification mode, determination with the sequential priority of HI>LO>OFF made by means of refrigerant discharge pressure Pd of compressor 56 detected by refrigerant discharge pressure sensor 88 and refrigerant discharge temperature Td of the compressor 56. For example, if the refrigerant discharge pressure Pd is 19 kgf/cm2, "HI" always results, no matter what Td may be.

The revolving speed of motor 66 driving compressor 56 of refrigeration cycle 55 is controlled by means of inverter 67. Drive circuit 30 for inverter 67, servomotors 26, 37, 39, 50, 51, and 53, fan motor 89a of the exterior fan 89, and blower motor 29 is controlled by means of electronic control unit (hereinafter termed "ECU") 68. ECU 68 is composed primarily of microcomputer, is provided with CPU 69, RAM 70 which temporarily stores various data and the like, ROM 71 which stores the program indicated in FIG. 4 and the like, A/D converter 72 which converts input data to digital signals, I/O port 73, crystal oscillator 74 which generates a reference signal of several MHz, and the like. Electrical power is supplied via ignition switch 76 from battery 75.

ECU 68 reads, via A/D converter 72, various sensor signals from inner air temperature sensor 77 that detects inner air temperature Tr, ambient air temperature sensor 78 that detects ambient air temperature Tam, sunlight sensor 79 that detects an amount of sunlight Ts entering into the passenger compartment, evaporator exit temperature sensor 80 that detects the air temperature immediately after passing through evaporator 31 (hereinafter termed "evaporator exit temperature") Te, condenser exit temperature sensor 81 that detects the air temperature immediately after passing through condenser 35 (hereinafter termed "condenser exit temperature") Tc, temperature-sense setting device 82 for enabling a rider to manually set a set temperature sense Sset to become the control target, intake air temperature sensor 46 that detects the temperature of air taking into evaporator 31 (hereinafter termed "intake air temperature") Tin, discharge temperature sensor 91 that detects the refrigerant discharge temperature Td, condenser exit refrigerant temperature sensor 92 that detects the condenser exit refrigerant temperature Tcr, and the like.

Figure 2:
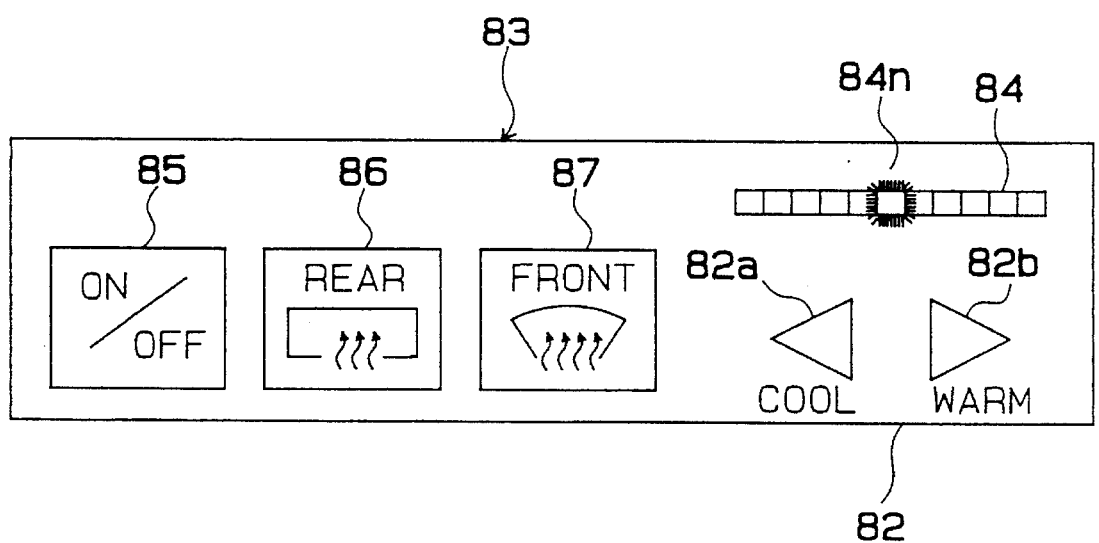
FIG. 2 is a front view of an air conditioner control panel.

The above-mentioned temperature-sense setting device 82 is provided with COOL key 82a and WARM key 82b, and is disposed on air conditioner control panel 83 positioned in the center of an instrument panel (not illustrated) of the automobile. As shown in FIG. 2, air conditioner control panel 83 is provided with temperature-sense display 84 in which a plurality of light-emitting elements 84n are arrayed in a horizontal row above the temperature-sense setting device. Temperature-sense display 84 displays the set temperature sense Sset input by means of COOL key 82a and WARM key 82b. Temperature sense Sset is an index indicating how much cooler or warmer than an average temperature of 25° C. as a reference (see FIG. 5A), and in the state before keys 82a and 82b are operated, light-emitting element 84n in the center of the temperature-sense display 84 is illuminated. Each time COOL key 82a is depressed, set temperature sense Sset is lowered by one rank and the illuminated position is shifted by one to the left. Each time WARM key 82b is depressed, set temperature sense Sset is raised by one rank and the illuminated position is shifted by one to the right. In addition to this, air conditioner control panel 83 is provided with air conditioner ON/OFF switch 85, rear defogger switch 86, and front defroster switch 87.

Figure 4B:
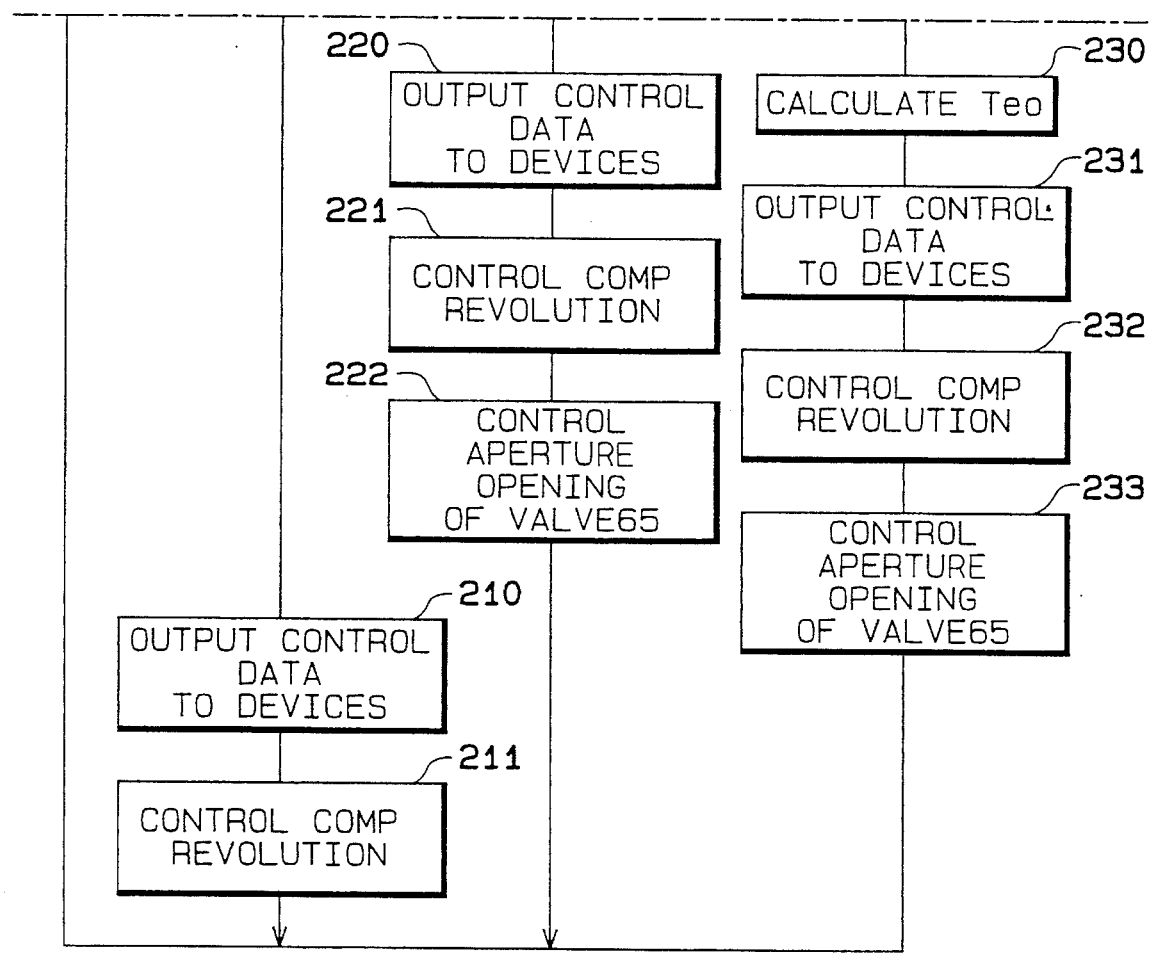
FIG. 4 consists of FIGS. 4A and 4B which together show a flowchart of a control program.

By executing the control program depicted in FIGS. 4A, and 4B ECU 68 performs control for all aspects of airconditioning operation, and also, when in the dehumidification mode, functions as a control means regulating the aperture opening of the electronic expansion valve 65, to be described later, and revolving speed of compressor 56.

The content of control by means of the ECU 68 will be described hereinafter with reference to the flowchart of FIGS. 4A and 4B 4.

First, in step 100, initialization processing is executed to initialize counters and flags to be used in subsequent operational processing, after which execution is transferred to step 110 and set temperature sense Sset input by operation of temperature-sense setting device 82 is read and, along with this, the various data for inner air temperature Tr, ambient air temperature Tam, amount of sunlight Ts, evaporator exit temperature Te, condenser exit temperature Tc, refrigerant discharge temperature Td, and condenser exit refrigerant temperature Tcr detected by sensors described above are read.

Next, execution is transferred to step 120, and set temperature Tset is calculated from set temperature sense Sset, ambient air temperature Tam, and amount of sunlight Ts by means of the following Equation (1).

$$Tset = f(Sset, Tam, Ts) \qquad (1)$$
$$= Tset' + \Delta Tam + \Delta Ts$$

Figure 5A:
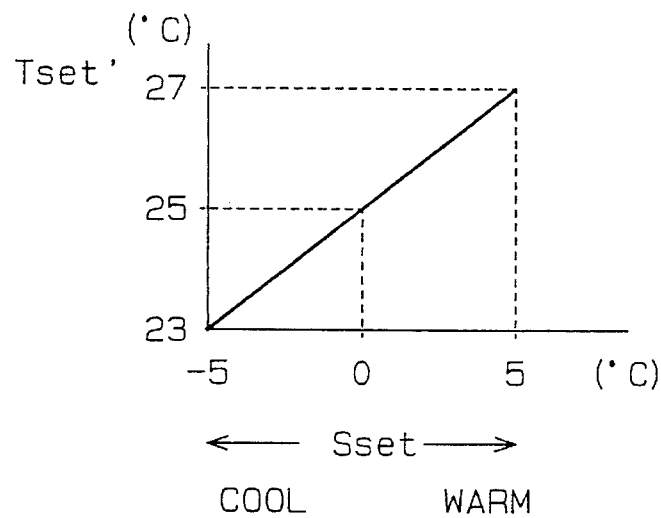
FIG. 5A is a diagram indicating a relationship between set temperature sense Sset and Tset'.
Figure 5B:
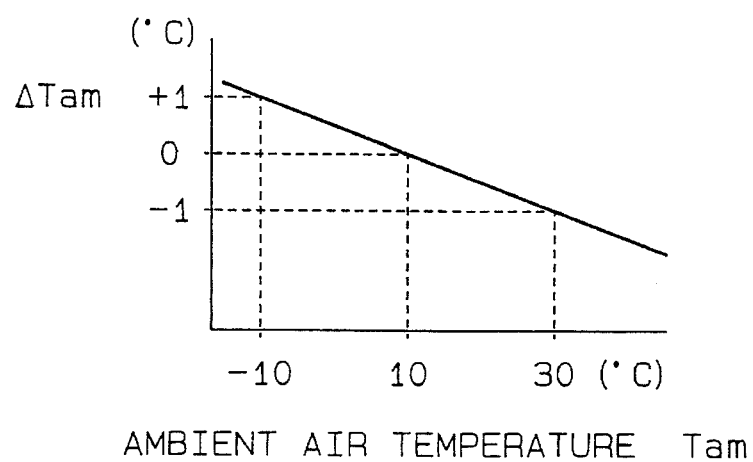
FIG. 5B is a diagram indicating a relationship between ambient air temperature Tam and ΔTam.
Figure 5C:
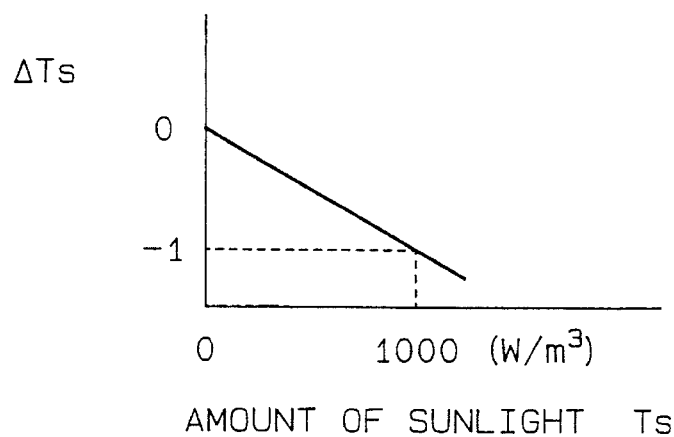
FIG. 5C is diagram indicating a relationship between amount of sunlight Ts and ΔTs.
Figure 6:
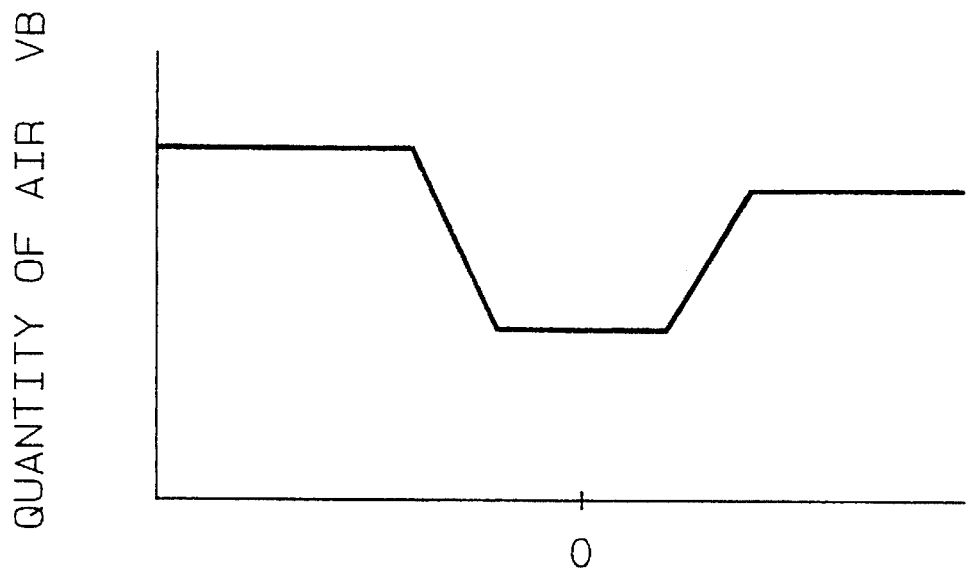
FIG. 6 is a diagram indicating a relationship between required quantity of heat QAO and quantity of air VB.
Figure 7:
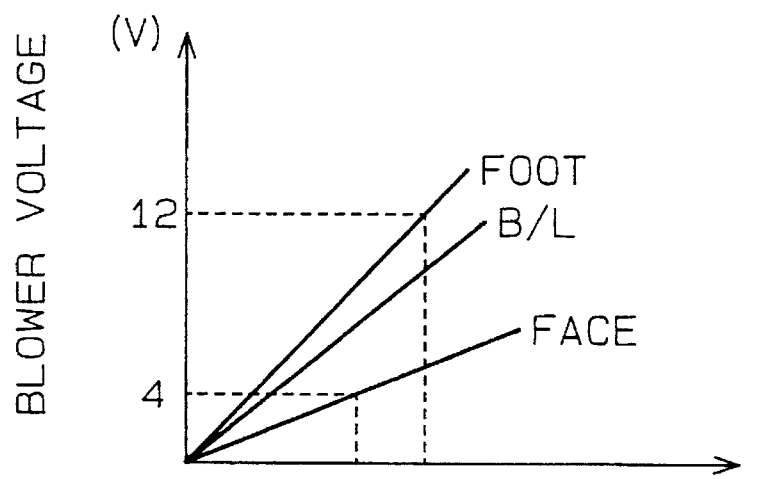
FIG. 7 is a diagram indicating a relationship between quantity of blown air VAO and blower voltage.

Here, $Tset' = 25 + 0.4Sset$ <- -> Refer to FIG. 5A $\Delta Tam = (10 - Tam)/20$ <- -> Refer to FIG. 5B $\Delta Ts = -Ts/1000$ <- -> Refer to FIG. 5C In the above manner, after set temperature Tset is calculated, execution is transferred to step 130 and quantity of heat QAO required to maintain the interior of the passenger compartment at the set temperature Tset is calculated by means of the following Equation (2).

$$QAO = K1 \times Tset - K2 \times Tr - K3 \times Tam - K4 \times C \qquad (2)$$

(K1, K2, K3, and K4: coefficients; C: constant)

After calculating required quantity of heat QAO by means of Equation (2), execution is transferred to step 140 and the presence or absence of an ON operation of front defroster switch 87 (hereinafter termed "DEF input") is determined. If there is no DEF input, execution is transferred to step 150 and quantity of air VB is calculated from the air quantity characteristics with respect to required quantity of heat QAO indicated in FIG. 6, and quantity of air VB is taken as quantity of blown air VAO. Next, in step 160 target blowing temperature TAO is calculated by means of the following Equation (3).

$$TAO = QAO/(Cp \cdot \gamma \cdot VAO) + Tin \qquad (3)$$

Here, cp is the specific heat of the air, y is the specific gravity of the air, and Tin is the temperature of the air taken into evaporator 31.

Thereafter, in step 170, the degree of opening of inner/outer air damper 25 is calculated so as to minimize the temperature difference between temperature (intake air temperature) Tin of the air taken in from inner air intake ports 23 and 24 and outer air intake port 22, and blowing temperature TAO. Next, in step 180, determination of whether to set the operation mode of the refrigeration cycle 55 to either the cooler (air) mode or the heater mode is made by means of the following Equation (4).

$$TM = TAO - Tin \qquad (4)$$

The heater mode is selected when the TM calculated by means of Equation (4) is $TM \geq +\theta$ (for example $\theta=2°C.$), the cooler mode is selected when $TM \geq -\theta$, and compressor 56 of refrigeration cycle 55 is stopped when $-\theta < TM < +\theta$.

After the operation mode of refrigeration cycle 55 has been determined in this manner, execution is transferred to step 190, where the degree of opening of the various dampers 36, 38, 46, 48, 49, and 54 are determined on the basis of the blowing temperature TAO and the quantity of blown air VAO, and either "FACE," "B/L," "FOOT," "FOOT/DEF," or "DEF" is determined to be the blowing mode. This concludes the processing in the case when there is no DEF input.

In the case when there is DEF input, execution is transferred from step 140 to step 155, and quantity of blown air VAO at the time of DEF is set, for example at 300 m³/h. Next, in step 165, after the degree of opening of the inner/outer air damper 25 is determined to be the ambient air mode, in step 175 target blowing temperature TAO (condenser target exit temperature) is calculated by means of the foregoing Equation (3).

Next, in step 185, determination of whether to set the operation mode of refrigeration cycle 55 to either the cooler mode or the heater mode is made similarly to as described above. (However, in the case when there is DEF input, the air mode is not performed.) Subsequently, execution advances to step 190, and after the blowing mode is determined to be "DEF," execution is transferred to step 200.

Based on the result of step 200, processing proceeds to either of steps 210, 220, or 230 according to the determination of the operation mode in steps 180 or 185. That is to say, in the cooler mode, execution advances to step 210 and various control data are output to various devices, and in step 211 feedback control for the revolving speed of compressor 56 is made by means of PI control or fuzzy control with reference to evaporator exit temperature Te detected by means of evaporator exit temperature sensor 80. At this time, in order to achieve quantity of blown air VAO calculated in step 150, the blower voltage applied to blower motor 29 is determined by means of the voltage characteristics indicated in FIG. 7 in accordance with the blowing mode. Additionally, if there is no DEF input, when the blown air for target blowing temperature TAO is created by mixing inner air and ambient air, the compressor is stopped and mixing of air is performed. When there is DEF input, compressor 56 is operated to perform dehumidification and cooling even in the above-described case.

Figure 9:
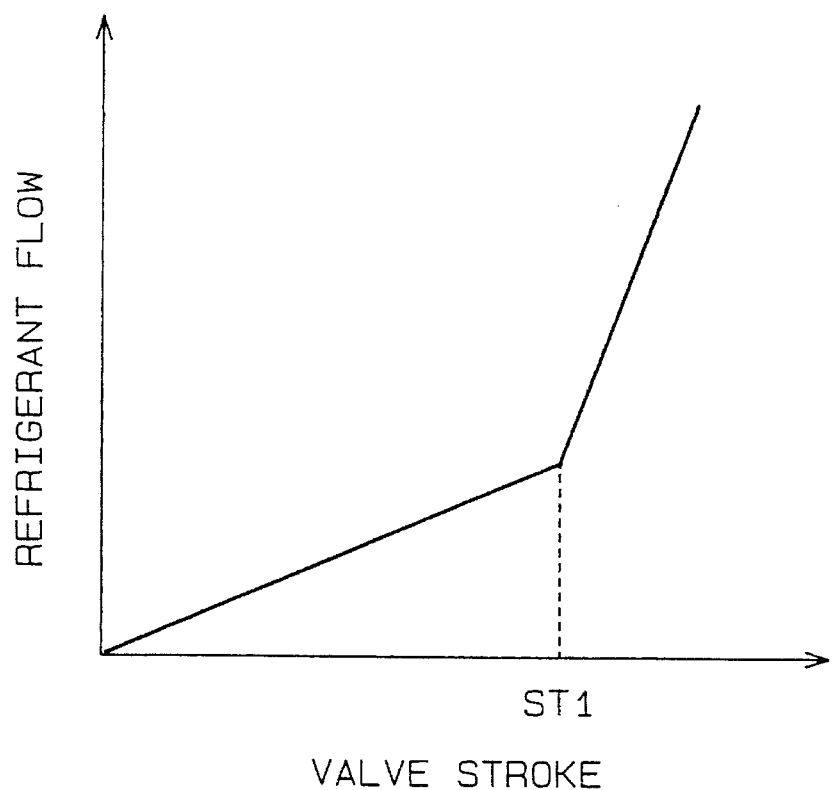
FIG. 9 is a diagram indicating a relationship between valve stroke (valve opening) of an electronic expansion valve and refrigerant flow.

In the heater mode, execution advances to step 220, various control data are output to various devices, and in step 221 feedback control for the revolving speed of compressor 56 is made by means of PI control or fuzzy control for condenser exit temperature Tc detected by means of condenser exit temperature sensor 81. Along with this, in step 222 the aperture opening of electronic expansion valve 65 is controlled so as to optimize the sub-cool of compressor 56 calculated from condenser exit refrigerant temperature Tcr detected by means of condenser exit refrigerant temperature sensor and refrigerant discharge pressure Pd of compressor 56 detected by means of refrigerant discharge pressure sensor 88. As shown in FIG. 9, the opening characteristic of electronic expansion valve 65 is established so that rate of increase of the refrigerant flow increases suddenly if valve stroke exceeds a specification value ST1.

Figure 8:
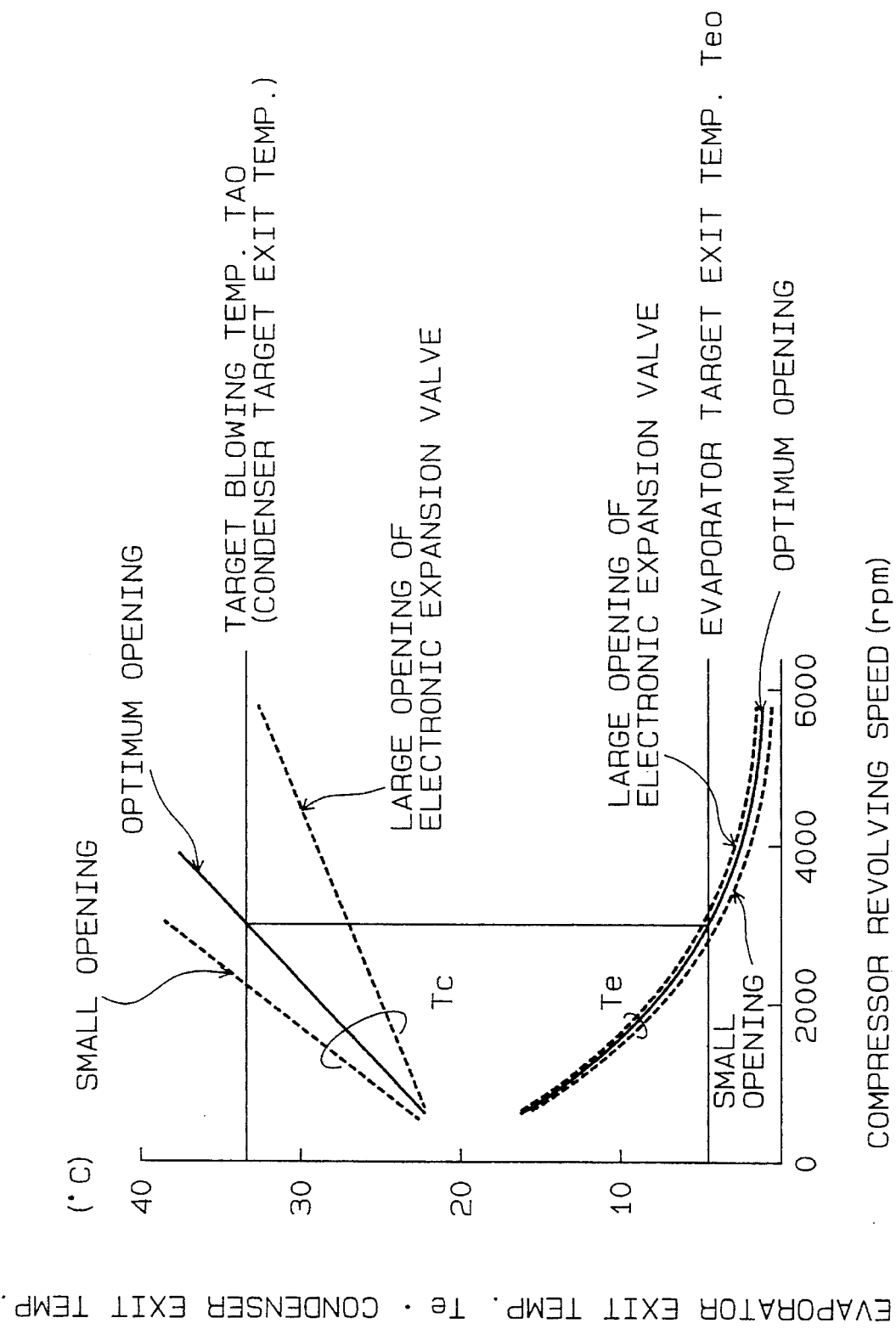
FIG. 8 is a diagram indicating a relationship between compressor revolving speed on the one hand and evaporator exit temperature and condenser exit temperature on the other as parameters for aperture opening of an electronic expansion valve.

In the dehumidification mode, execution advances to step 230, evaporator target exit temperature Teo is calculated so as to satisfy for example the intake air temperature Tin (15° C. and also 3° C. or over). In step 231 control data is output to various devices. Next, in step 232, the revolving speed of compressor 56 is controlled so that the evaporator exit temperature Te detected by means of evaporator exit temperature sensor 80 becomes the foregoing evaporator target exit temperature Teo. In step 233, the aperture opening of electronic expansion valve 65 is controlled so that condenser exit temperature Tc detected by means of condenser exit temperature sensor 81 becomes the target blowing temperature TAO (condenser target exit temperature). The relationship between revolving speed of compressor 56, evaporator exit temperature Te, condenser exit temperature Tc, and the aperture opening of electronic expansion valve 65 at this time is indicated in FIG. 8.

In this case, when the aperture opening of electronic expansion valve 65 is adjusted, the pressures of both condenser 35 and exterior heat exchanger 58 change. Further, the temperature (heat-radiating capacity) of condenser 35 and the temperature of exterior heat exchanger 58 also change. By such a method, if the temperature of exterior heat exchanger 58 becomes sufficiently higher than the ambient air temperature, the heat-radiating capacity of exterior heat exchanger 58 as an "exterior condenser" increases, and heat-radiating capacity of the condenser 35 is lowered in relation thereto. Additionally, if the temperature of exterior heat exchanger 58 approaches the ambient air temperature, the heat-radiating capacity of exterior heat exchanger 58 as an "exterior condenser" drops, and the heat-radiating capacity of condenser 35 is raised, respectively. Moreover, if the temperature of exterior heat exchanger 58 becomes substantially the same as the ambient air temperature, exterior heat exchanger 58 assumes a state where substantially no exchange of heat with the ambient air is performed (a simple refrigerant path).

By adjusting the aperture opening of electronic expansion valve 65 and causing the heat-exchanging functioning of exterior heat exchanger 58 to change in this manner, the heat-radiating capacity of condenser 35 and heat-absorbing capacity of evaporator 31 can be adjusted over a comparatively wide range, the temperature adjustment range of the blown air when in the dehumidification mode can be expanded, and temperature control when in the dehumidification mode can be enhanced.

Furthermore, according to this embodiment the revolving speed of compressor 56 is also adjusted along with the aperture opening of electronic expansion valve 65 when in the dehumidification mode, and so the refrigerant discharge pressure of compressor 56 can also be adjusted. Because of a synergistic effect with the adjustment of the aperture opening of electronic expansion valve 65, evaporator exit temperature Te and the condenser exit temperature Tc can both be controlled at appropriate temperatures. By means of this, it is possible to control condenser exit temperature Tc at an appropriate temperature such that the temperature of the blown air assumes the target blowing temperature TAO while controlling evaporator exit temperature Te such that sufficient dehumidification capacity is assured within a range where there is no excessive cooling.

Additionally, according to the above-described embodiment, in the case where exterior heat exchanger 58 is disposed in a state receiving wind accompanying travel of the electric vehicle, if the structure is modified so that the aperture opening of electronic expansion valve 65 becomes smaller when, for example, there develops a state wherein the difference between the temperature of exterior heat exchanger 58 and the ambient air temperature expands beyond a pre-established temperature range, then a mode of operation and effects such as the following are obtained.

Briefly, in the dehumidification mode condenser 35 and exterior heat exchanger 58 function as a refrigerant condenser in a series-connected state, but because electronic expansion valve 65 with an aperture opening adjusted to a small state exists between condenser 35 and exterior heat exchanger 58, the majority of refrigerant discharged from compressor 56 is condensed by condenser 35. Along with this, the condensation heat thereof is provided for heat exchange with the wind dehumidified and chilled by evaporator 31. Consequently, because there develops a state wherein refrigerant of comparatively low temperature flows into the exterior heat exchanger 58, in other words, a state wherein the difference between the temperature of refrigerant flowing into exterior heat exchanger 58 and the ambient air temperature has become small, exterior heat exchanger 58 can be considered as simply a pipe for refrigerant passage. As a result of this, the temperature of condenser 35 during the dehumidification mode becomes resistant to fluctuations according to the magnitude of vehicle speed and the temperature of blown air after heat exchange with condenser 35 is stabilized, even when exterior heat exchanger 58 is disposed in a state receiving wind accompanying travel of the vehicle.

Figure 10:
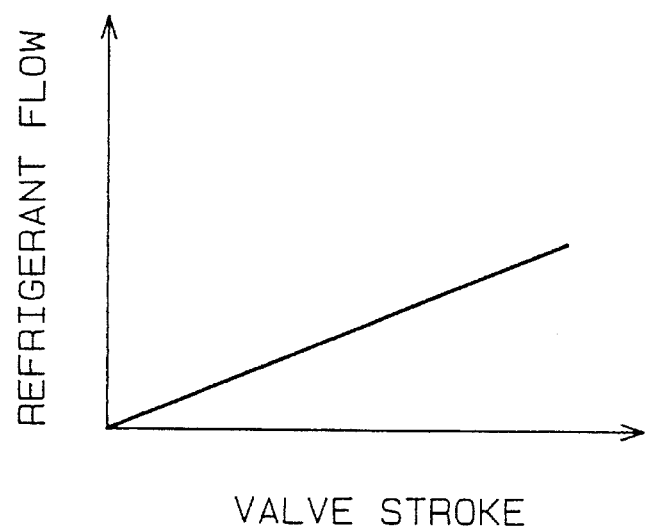
FIG. 10 is a diagram indicating a relationship between valve stroke (valve opening) of an electronic expansion valve utilized in a second embodiment according to this invention and refrigerant flow.

Moreover, according to the foregoing embodiment the opening characteristic of electronic expansion valve 65 is established so that a rate of increase of the refrigerant flow increases suddenly if the valve stroke exceeds a specified value ST1, as shown in FIG. 9. It is also acceptable to form a variable aperture by connecting in parallel a solenoid valve and a general electrical expansion valve having linear opening characteristics as indicated in FIG. 10. In this case, it is acceptable to cause actuation so as to open the solenoid valve when the aperture opening (valve stroke) of the electrical expansion valve reaches a specified value.

Figure 11:
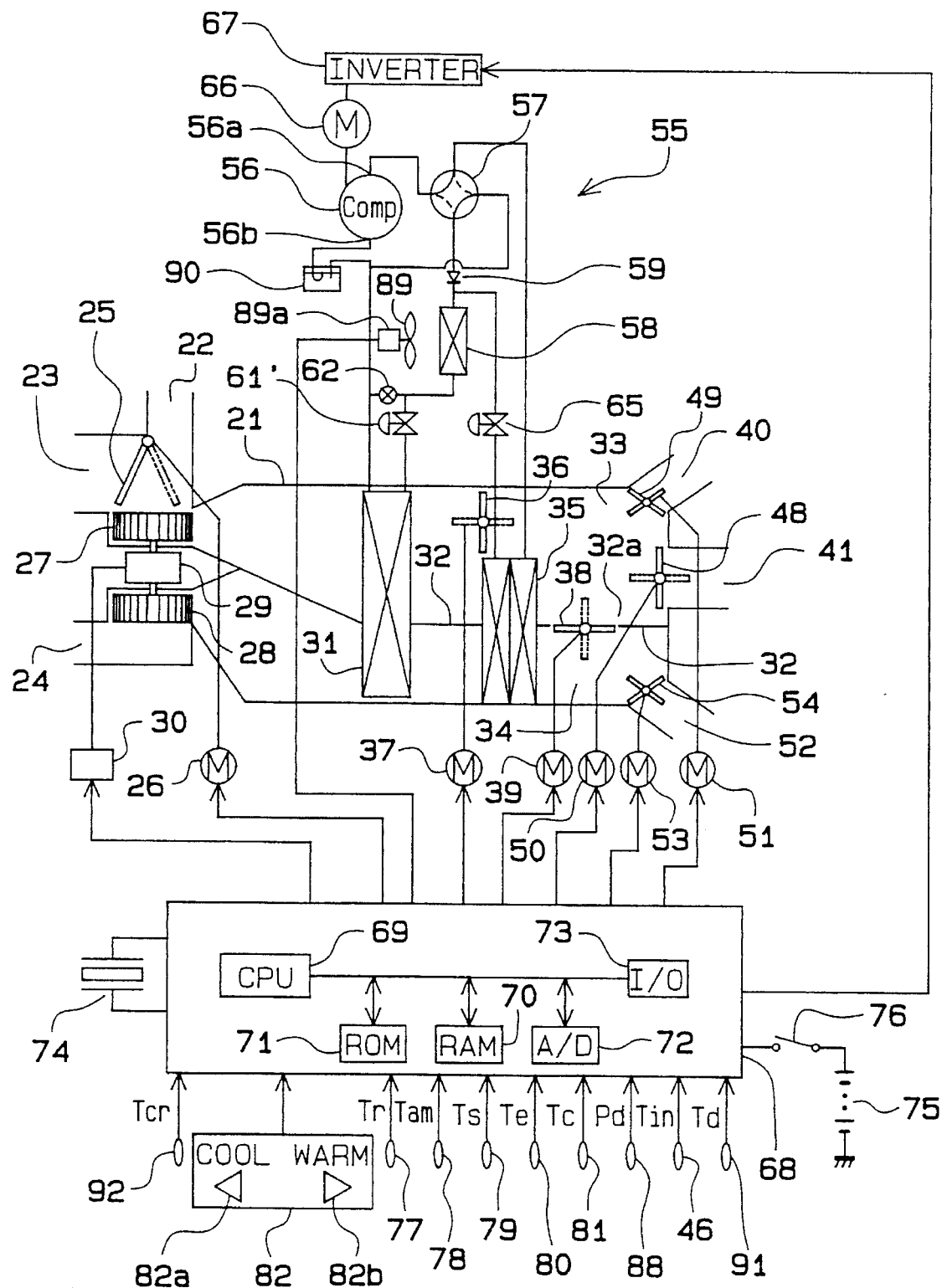
FIG. 11 is a structural schematic drawing indicating the entirety of an air-conditioning apparatus according to a second embodiment of this invention.

Additionally, according to this embodiment a fixed restrictor, capillary 61, is provided in the refrigerant passage between exterior heat exchanger 58 and evaporator 31. It is also acceptable to change this to electronic expansion valve for cooler use 61' which has a variable aperture (corresponding to the second restrictor according to this invention) and control the aperture opening of expansion valve 61' together with the aperture-opening of electronic expansion valve 65 (hereinafter termed the "electronic expansion valve for heater use") on the outlet side of condenser 35, as in a second embodiment according to this invention which is depicted in FIG. 11. Switching control at this time for electronic expansion valves 61' and 65 and four-way switching valve 57 is performed as shown in Table II according to the operation mode of the refrigeration cycle 55.

TABLE II

| Input | Output | | |
|---|---|---|---|
| Operation Mode of Refrigeration Cycle 55 | Electric Expansion Valve 61' | Electronic Expansion Valve 65 | Four-Way Switching Valve 57 |
| OFF | Fully Open | Fully Open | OFF (solid Line) |
| Cooler | Desired | Fully Open | ON (dotted line) |

TABLE II-continued

| Input | Output | | |
|---|---|---|---|
| Operation Mode of Refrigeration Cycle 55 | Electric Expansion Valve 61' | Electronic Expansion Valve 65 | Four-Way Switching Valve 57 |
| Heater | Aperture Opening Fully Open | Desired Aperture Opening | OFF (solid line) |
| Defrost | Desired Aperture Opening | Fully Open | OFF (solid line) |
| Dehumidify | Desired Aperture Opening | Desired Aperture Opening | OFF (solid line) |

In this case, cycle matching during the cooling and defrosting modes can be performed better than in the first embodiment, and along with this temperature control in the dehumidification mode can be further enhanced.

That is to say, by controlling the combination of the degrees of opening of the two electronic expansion valves 61' and 65 as desired during the dehumidification mode, free control is possible, from the case where the temperature of exterior heat exchanger 58 is made higher or lower with respect to the ambient air temperature and exterior heat exchanger 58 is made to function as an "exterior condenser," through the case where it is made to function as a "refrigerant condenser," and to the case where it is made to function as an "exterior evaporator." For this reason, the heat-radiating capacity of condenser 35 and the heat-absorbing capacity of evaporator 31 can be adjusted over a wide range in accordance with exterior and interior temperature and humidity conditions, the temperature control range for blown air during the dehumidification mode can be further expanded, and temperature control can be further enhanced.

A concrete embodiment of a case adopting a system structure such as that depicted in the above-mentioned FIG. 11 will be described hereinafter with reference to FIGS. 12 to 17.

Figure 16:
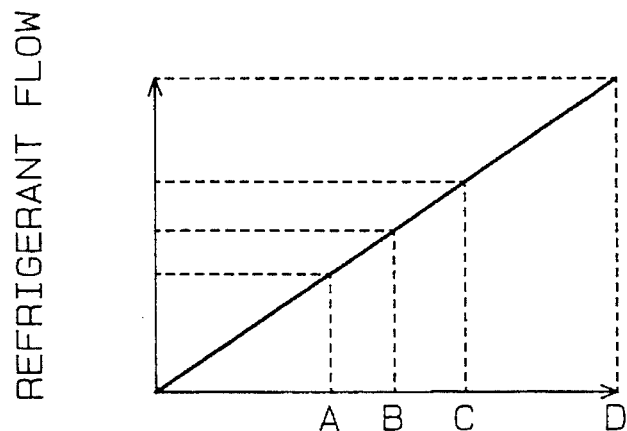
FIG. 16 is a diagram indicating a relationship between valve opening of an electronic expansion valve and refrigerant flow.

The content of control by means of ECU 68 will be described hereinafter with reference to the flowchart of FIG. 12. However, because FIG. 12 contains areas identical to the content of control indicated in FIG. 4, such portions have been given identical step numbers and descriptions thereof will be omitted, and only differing areas will be described. Additionally, according to this embodiment, the opening characteristics of electronic expansion valve 61' for cooling use and electronic expansion valve 65 for heater use have been established so as to be linear characteristics, as is shown in FIG. 16.

In the case where the branching destination in step 200 is the heater mode, then after execution of step 211 for controlling the compressor revolving speed, step 212 is executed to control the aperture opening of the electronic expansion valve 61' for cooling use so as to assume an appropriate state in accordance with the cooler load.

In the case where the branching destination in step 200 is the dehumidification mode, then after execution of step 232 for controlling the compressor revolving speed, steps 233 and 234 are executed to control the aperture opening of electronic expansion valve 61' for cooling use and electronic expansion valve 65 for heater use. Details of the content of the control in steps 233 and 234 are summarized in FIG. 13, and will be described hereinafter.

Figure 13:
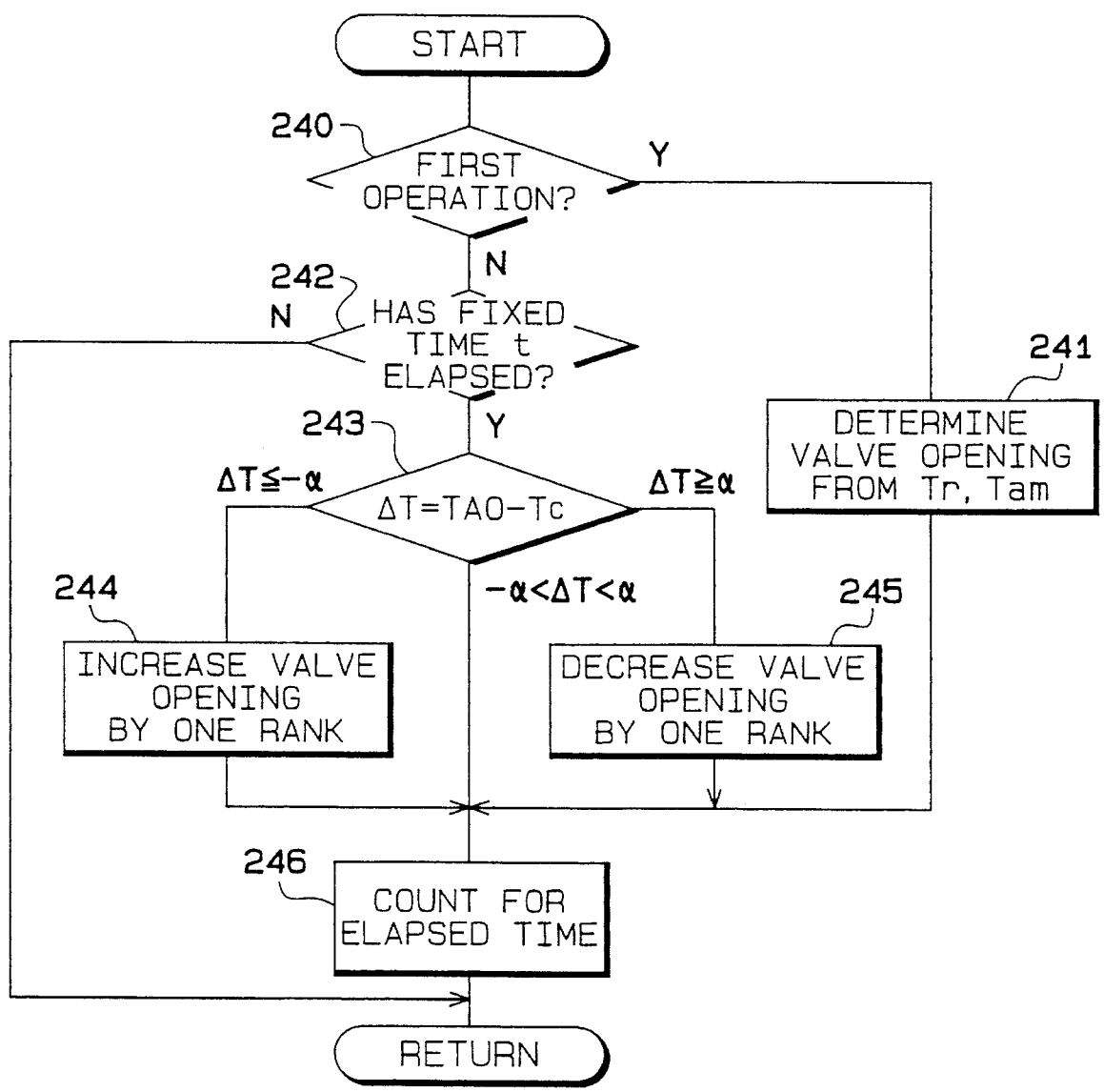
FIG. 13 is a flowchart of the salient areas of the same control program.

Briefly, in FIG. 13, after dehumidification mode selection, it is determined whether this was the first operation (step 240), and in the case of first operation, step 241 is executed in order to determine the initial value for valve opening (defined identical to valve stroke, or in other words, aperture opening) based on inner air temperature Tr and ambient air temperature Tam at that time.

Figures 14, 15:
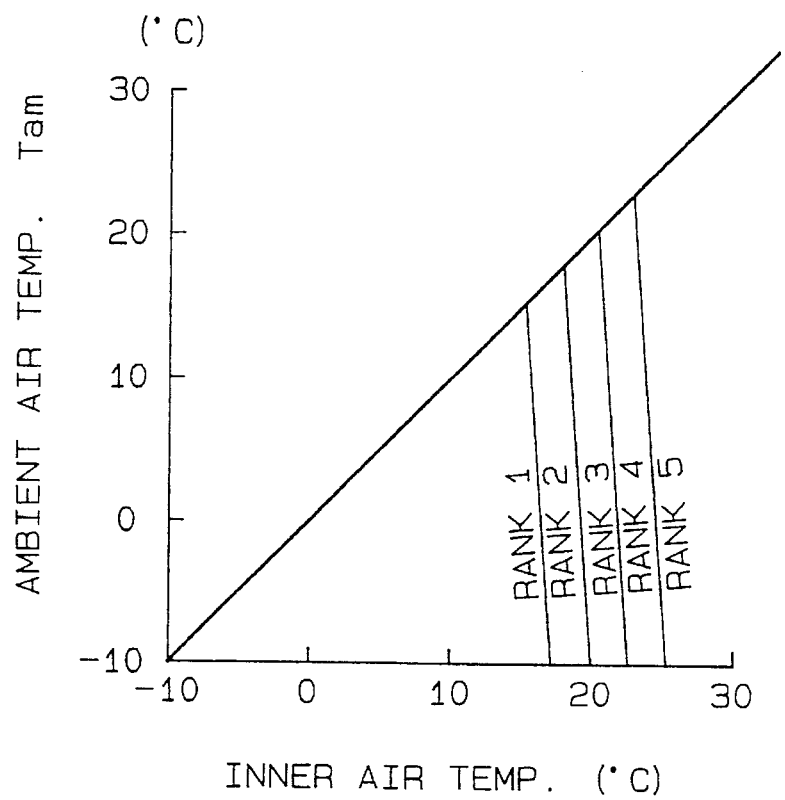
FIG. 14 is a diagram indicating a relationship between inner air temperature Tr and ambient air temperature Tam as well as ranks of combinations of valve openings of two electronic expansion valves.
FIG. 15 indicates the content of ranks of combinations of valve openings of two electronic expansion valves.

Here, as is shown in FIG. 16, the valve opening of electronic expansion valves 61' and 65 are controlled in, for example, four stages of A, B, C, and D, and the combinations of the valve opening of electronic expansion valves 61' and 65 are established in five types of ranks from 1 to 5, as is shown in FIG. 15. Then, in step 241, either of the ranks from 1 to 5 is selected on the basis of inner air temperature Tr, the ambient air temperature Tam, and pre-established characteristics such as those depicted in FIG. 14, and by means of this the initial values for the valve openings of electronic expansion valves 61' and 65. After determination of the initial values for the valve openings in this manner, step 246 is executed to count elapsed time from the initial value, after which there is a return.

Moreover, when step 240 is executed subsequent to this, the decision "NO" is made here, and in this case step 242 is executed to decide whether the fixed time t has elapsed. In the case that the fixed time t has not elapsed an immediate return is performed, and consequently the valve openings of electronic expansion valves 61' and 65 are maintained without change in their present state during the interval until the fixed time t has elapsed.

When the fixed time t has elapsed, in step 243 a determination is made of the relationship of differential temperature ΔT, which is actual condenser exit temperature Tc subtracted from target blowing temperature TAO, with respect to a discrimination value α pre-established with consideration to the allowed range of the temperature control range.

In the case when the relationship is such that ΔT≦−α, when the actual blowing temperature from air duct 21 indicated by condenser exit temperature Tc is in a state higher than the target blowing temperature TAO, then after executing step 244 to increase the valve opening combination depicted in FIG. 15 by one rank, there is a return via step 246 to initiate the count for elapsed time. Consequently, in the case where for example the valve opening combination is at rank 3 (i.e., the case where, as can be understood from FIG. 15, the valve opening of electronic expansion valve 61' is C and the valve opening of electronic expansion valve 65 is B (B<C)), and the combination of these valve openings is changed to rank 4 in step 244, adjustment is made so that the valve openings of the electronic expansion valves 61' and 65 both become C. In the case where the combination of valve openings is at rank 5, that state is maintained.

Additionally, in the case when the relationship is such that ΔT≧α, that is to say, when actual blowing temperature is at a state lower than target blowing temperature TAO, then after executing step 245 to increase the valve opening combination depicted in FIG. 15 by one rank, there is a return via step 246 to initiate the count for elapsed time. Consequently, in the case where for example the valve opening combination is at rank 3, adjustment is made so that the combination of these valve openings is changed to rank 2 (i.e., the case where the valve opening of electronic expansion valve 61' is C and the valve opening of electronic expansion valve 65 is A). In the case where the combination of valve openings is at rank 1, that state is maintained.

Moreover, in the case when the relationship is such that −α<ΔT<α, that is to say, in the case when the difference between the actual blowing temperature and target blowing temperature TAO is within an allowed range, there is a return via step 246 while maintaining the combination rank of the valve openings in an unchanged state.

Figure 17:
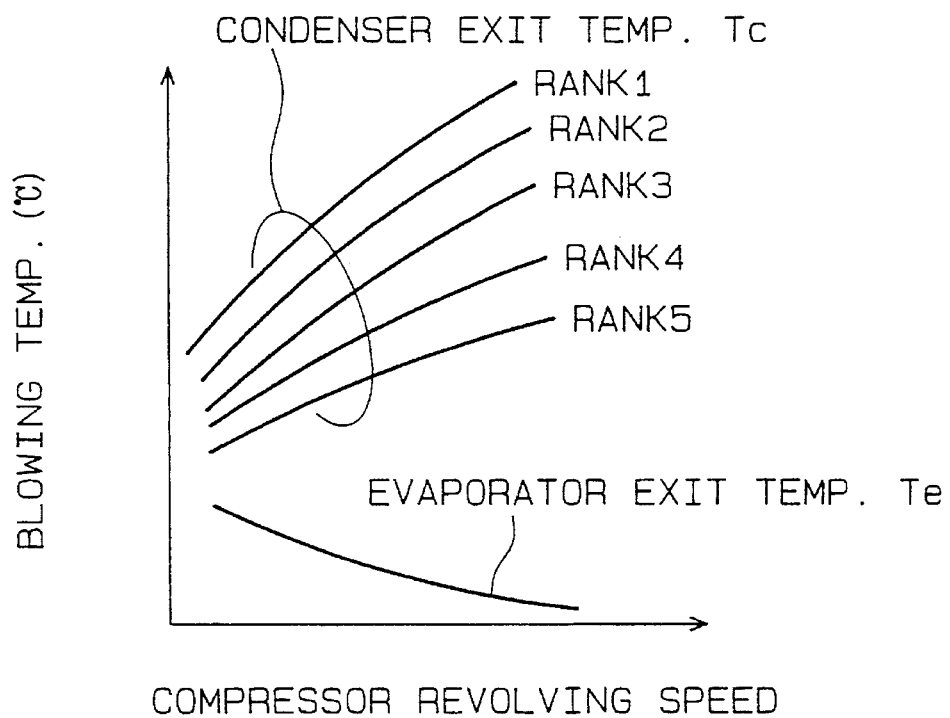
FIG. 17 a diagram indicating a relationship between compressor revolving speed and evaporator exit temperature as well as indicating a relationship between compressor revolving speed and actual blowing temperature from an air duct as parameters for ranks of combinations of valve openings of two electronic expansion valves.

As a result of performing the above-described control, in the state where the defrost mode has been selected the combination of valve openings for electronic expansion valve 61' and electronic expansion valve 65 is corrected with each passage of fixed time t on the basis of the actual amount of discrepancy of the blowing temperature and target blowing temperature TAO. In this case, as is shown in FIG. 17, condenser exit temperature Tc and in its turn the actual blowing temperature vary in accordance with the change in the combination of valve openings of electronic expansion valves 61' and 65 between rank 1 and rank 5. In the case when the above-mentioned correction has been performed, the difference between the actual blowing temperature and the target blowing temperature TAO is reduced with each passage of fixed time t, and the control characteristics for blowing temperature can be effectively and vastly improved.

Figure 18:
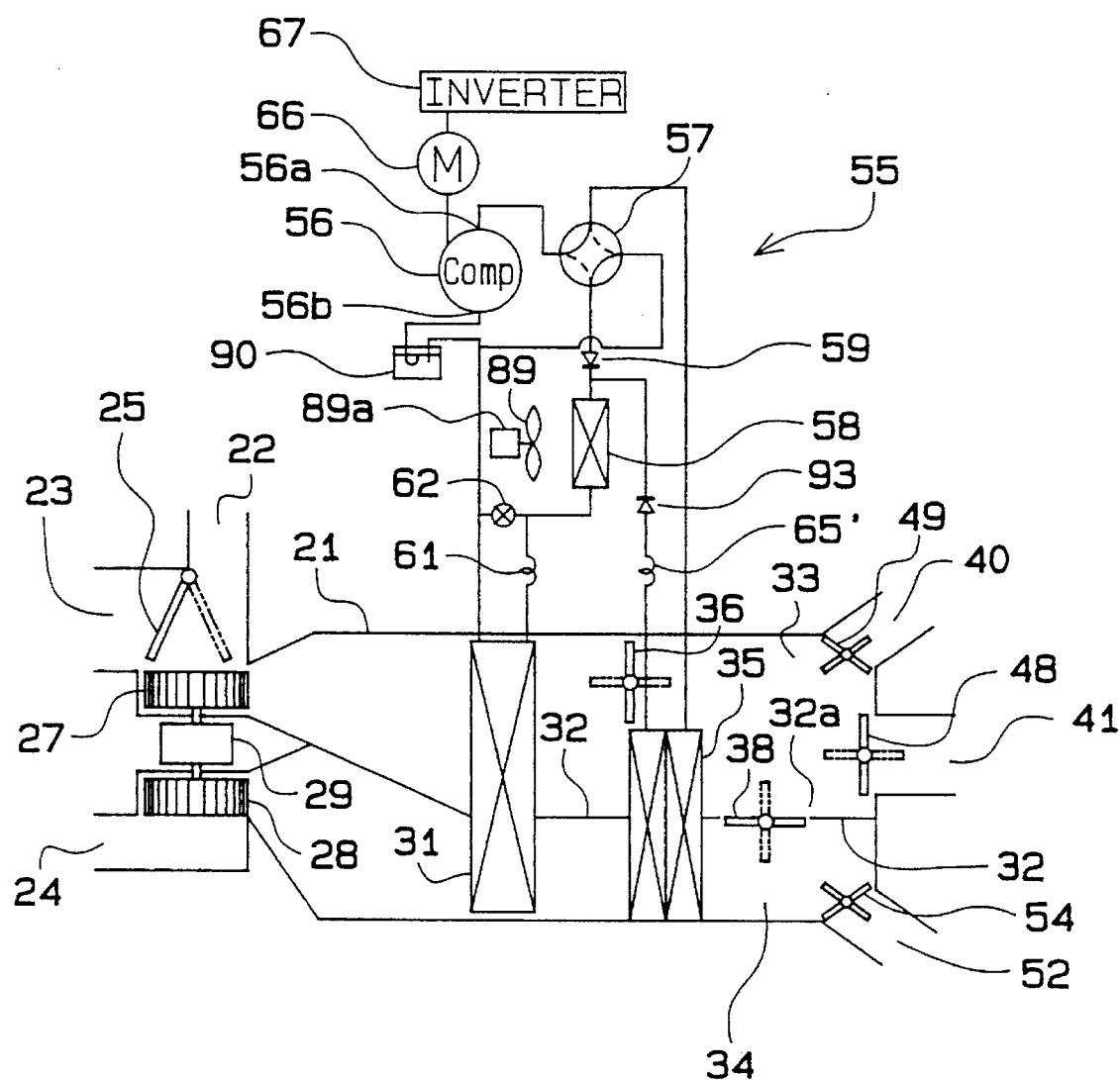
FIG. 18 is a structural schematic drawing indicating the salient areas of an air-conditioning apparatus according to a third embodiment of this invention.
Figure 19A:
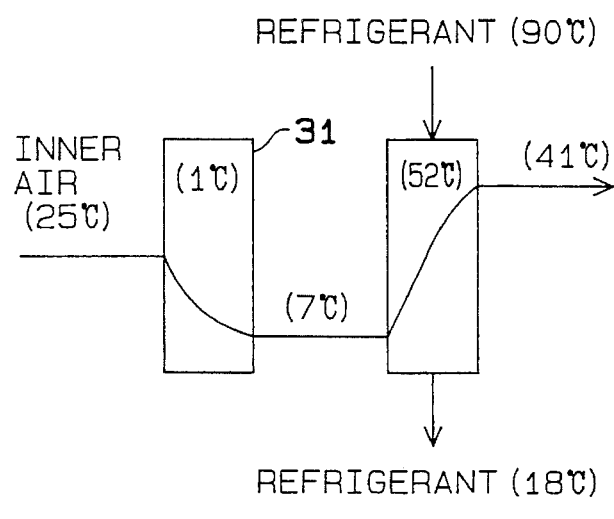
FIGS. 19A and 19B are drawings for the purpose of describing the operation of the present invention.
Figure 19B:
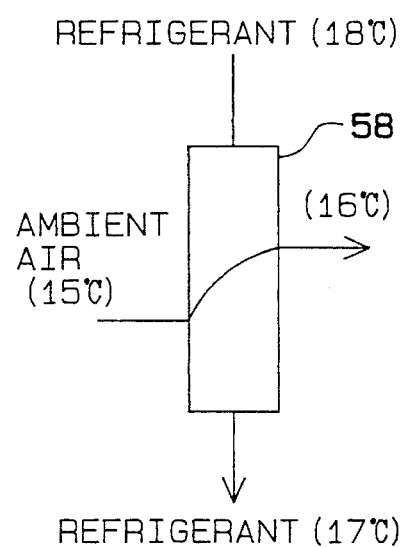
Figure 20:
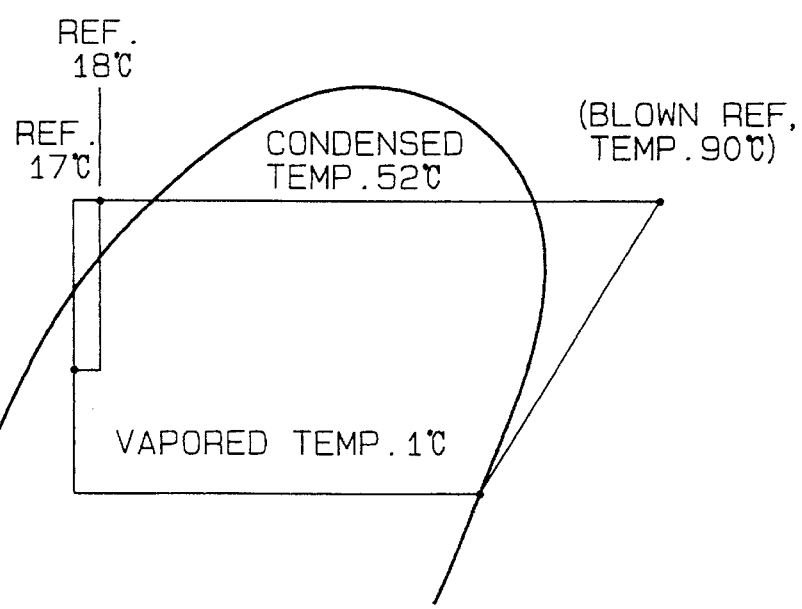
FIG. 20 is a Mollier diagram of dehumidification mode.

FIGS. 18 to 20 illustrate third embodiment according to the present invention, and only difference between the first and third embodiments will described below.

Briefly, as is shown in the structural schematic of the salient portions of the air-conditioning apparatus depicted in FIG. 18, this third embodiment provides capillary 65' (corresponding to the firat restrictor of the present invention), which is a fixed restrictor replaces expansion valve 65 of the first embodiment, as well as providing check valve 93 between capillary 65' and exterior heat exchanger 58 to block the inflow of refrigerant from relevant exterior heat exchanger 58 side to capillary 65' side.

In this case, in the dehumidification mode four-way switching valve 57 is switched to the position indicated by solid lines, the "OFF" position, and along with this, electronic expansion valve 65 is switched off. Consequently, refrigerant discharged from discharge port 56a of compressor 56 circulates on a path from condenser 35 to capillary 65', to check valve 93, to exterior heat exchanger 58, to capillary 61, to evaporator 31, to accumulator 90, and then to intake port 56b of compressor 56. By means of this, wind dehumidified and chilled by evaporator 31 is reheated to the target blowing temperature by condenser 35, and is then blown into the passenger compartment.

This operation in the dehumidification mode will be described hereinafter with use of examples of concrete numerical values. Briefly, as is shown typically in FIG. 19 A, in the case where the temperature of the passenger compartment air exchanging heat with evaporator 31 is 25° C. and the refrigerant evaporation temperature within evaporator 31 is 1° C., then after the air thereof is dehumidified and chilled to a temperature of for example 7° C. by means of heat exchange with evaporator 31, the air is reheated to approximately 41° C. by condenser 35 and blown into the passenger compartment.

In this case, in the dehumidification mode condenser 35 and exterior heat exchanger 58 function as a refrigerant condenser in a series-connected state. However, because in actuality capillary 65' is provided between condenser 35 and exterior heat exchanger 58, the majority of the refrigerant, at a temperature of approximately 90° C., discharged from compressor 56 is condensed by condenser 35, and in correspondence with the reheating of the above-mentioned air by means of the condensation heat thereof, the temperature of the refrigerant discharged from compressor 56 is reduced to approximately 18° C.

Consequently, a state develops whereby refrigerant at the comparatively low temperature of approximately 18° C. flows into exterior heat exchanger 58, and so the difference between the refrigerant temperature and the ambient air temperature is reduced. Here, in the case where the ambient air temperature is 15° C., as is shown typically in FIG. 19B), the temperature of the refrigerant flowing out from exterior heat exchanger 58 is lowered to approximately 17° C. in accordance with the exchange of heat of the ambient air and exterior heat exchanger 58, and along with this the temperature of the ambient air passing through exterior heat exchanger 58 is elevated to approximately 16° C. That is to say, in a state wherein the difference in temperature between the refrigerant flowing into exterior heat exchanger 58 and the ambient air temperature has been reduced, the amount of refrigerant condensation by exterior heat exchanger 58 is reduced, and exterior heat exchanger 58 can be considered as simply a pipe for refrigerant passage. FIG. 20 is a Mollier diagram of the refrigeration cycle in the above-described dehumidification mode.

As a result of this, the temperature of condenser 35 during the dehumidification mode becomes resistant to fluctuations according to the magnitude of vehicle speed, and the temperature of the wind after being reheated by means of condenser 35 is stabilized, even when foregoing exterior heat exchanger 58 is disposed in a state receiving wind accompanying travel of the vehicle.

Moreover, because only capillaries 61 and 65' which are fixed restrictors are provided as restrictors disposed in the refrigerant passage, the structure thereof can be simplified and contribution can be made to reduce production cost. Further, the number of movable portions can be reduced and reliability with respect to service life can be enhanced.

Furthermore, in the case of this embodiment, defrosting operation involving supplying high-temperature gas refrigerant to exterior heat exchanger 58 and removing frost adhering to exterior heat exchanger 58 cannot be performed. However, because an electric vehicle mounted with an air-conditioning apparatus according to this embodiment definitely has standby time for the purpose of recharging, it is acceptable to conduct defrosting of foregoing exterior heat exchanger 58 during this standby time, with no practical obstacles existing.

Figure 21:
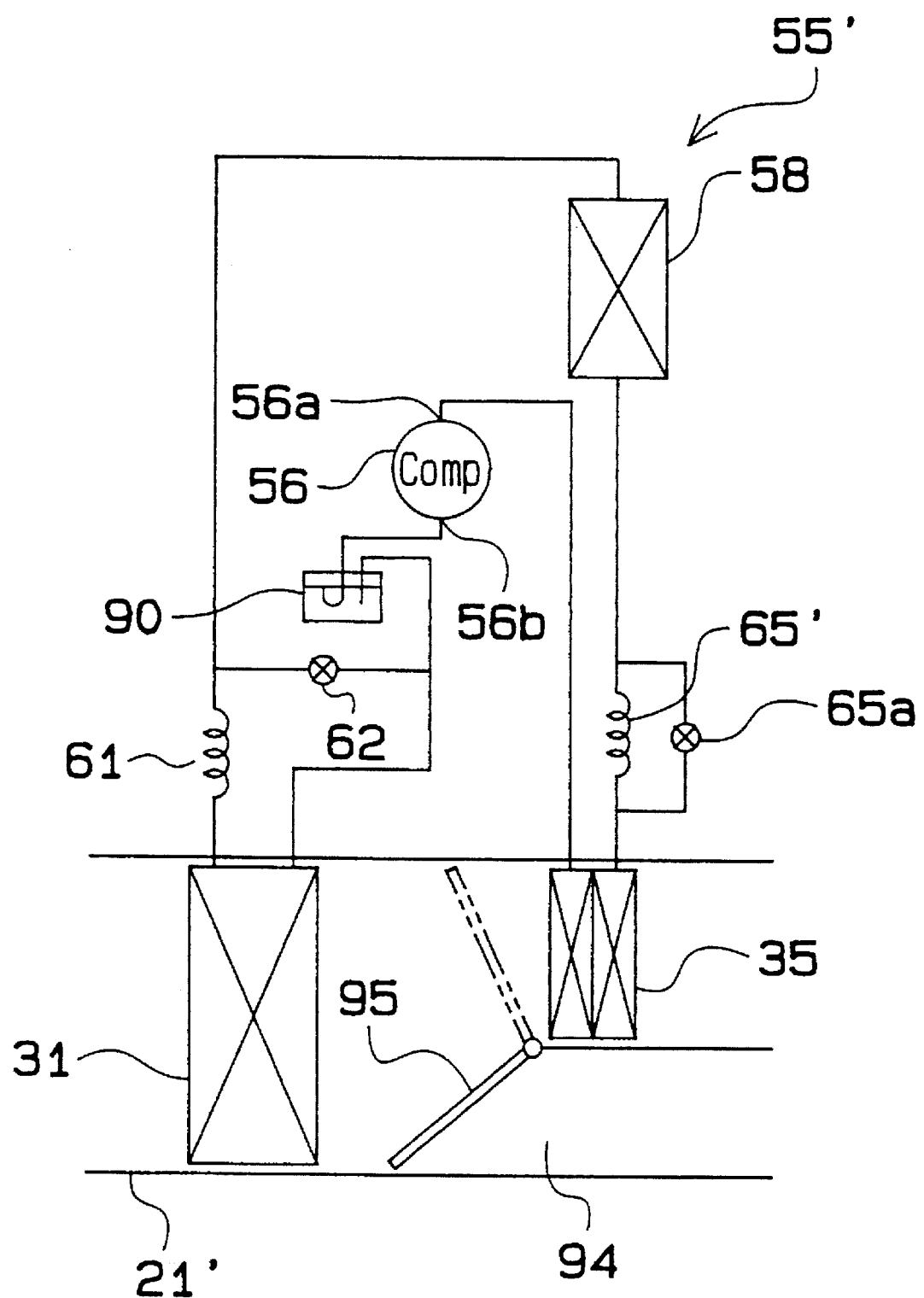
FIG. 21 is a structural schematic drawing indicating the salient areas of an air-conditioning apparatus according to a fourth embodiment of this invention.

FIG. 21 depicts a fourth embodiment according to the present invention. Only areas differing from the embodiment of FIG. 18 will be described below.

Briefly, FIG. 21 is a structural schematic of the salient portions of the air-conditioning apparatus. Within air duct 21', evaporator 31 is disposed on the upstream side and condenser 35 is disposed on the downstream side. In this case, condenser 35 is disposed in a state having specified bypass passage 94 in the interval with the side wall of air duct 21'. Air damper 95 provided within the air duct 21' is positioned, indicated by double dotted lines, such that the upstream side of condenser 35 is closed when in the cooling mode, and is positioned, indicated by solid lines, such that the bypass valve is closed when in the heater mode or the dehumidification mode.

A refrigerant circulation circuit of refrigeration cycle 55' including evaporator 31 and condenser 35 connects condenser 35, capillary 65', exterior heat exchanger 58, capillary 61, evaporator 31, and accumulator 90 in this sequence between discharge port 56a and intake port 56b of compressor 56. Also, solenoid valve 65a is connected in parallel with capillary 65' and solenoid valve 62 is connected between exterior heat exchanger 58 and accumulator 90.

According to a refrigeration cycle 55' structured in this manner, in the operating state of compressor 56 refrigerant constantly flows through compressor 56, and in a case such as during the cooling mode when air heating by condenser 35 is not required, the upstream side of condenser 35 is closed by means of air damper 95. Additionally, during the cooling mode solenoid valve 65a is switched to the "ON" state and solenoid valve 62 is switched to the "OFF" state, and during the heater mode solenoid valve 65a is switched to the "OFF" state and solenoid valve 62 is switched to the "ON" state. During the dehumidification mode, electromagnetic valve 65a and solenoid valve 62 are both switched to the "OFF" state.

Consequently, during dehumidification in particular the refrigerant discharged from compressor 56 circulates on a path from condenser 35 to capillary 65' to exterior heat exchanger 58, to capillary 61, to evaporator 31, to accumulator 90, and then to compressor 56, and so effects similar to the above-described third embodiment can be obtained.

Figure 22:
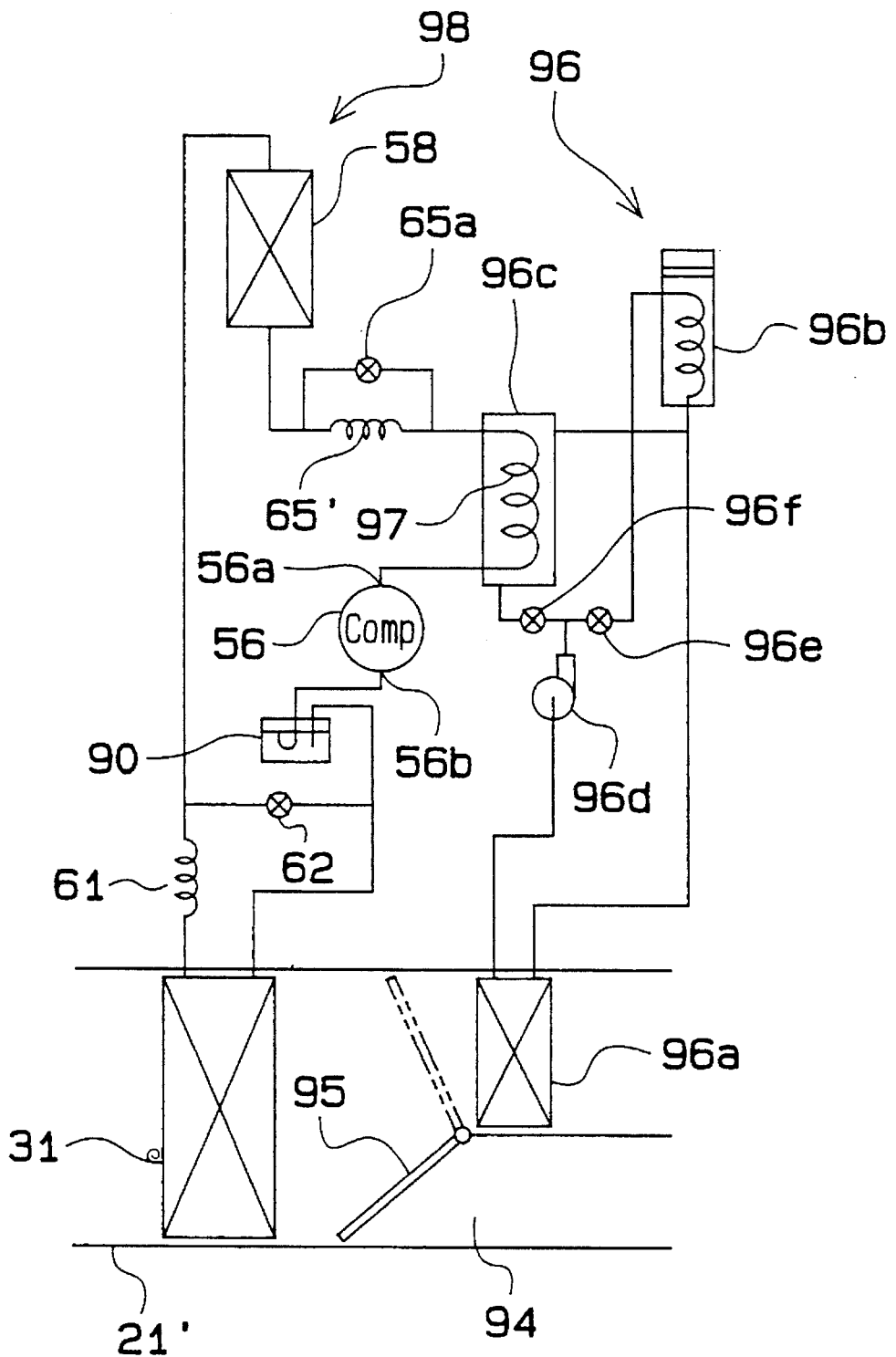
FIG. 22 is a structural schematic drawing indicating the salient areas of an air-conditioning apparatus according to a fifth embodiment of this invention.

FIG. 22 illustrates a fifth embodiment according to this invention. Only differences between the fourth and fifth embodiments will be described below.

Briefly, this embodiment presupposes utilization of combustion type heating unit 96 to conduct heating of the wind which has passed through evaporator 31. Concretely, as is shown in FIG. 22, warm-water heater 96a of combustion type heating unit 96 is disposed within air duct 21', which has evaporator 31 and air damper 95 disposed therein, as a heat source replacing condenser 35 of the fourth embodiment.

In addition to warm-water heater 96a, combustion type heating unit 96 is provided with combustion type heater 96b, heat exchanger 96c, pump 96d, and solenoid valves 96e and 96f in order to form a closed loop along with warm-water heater 96 through which water flows. By means of switches the operation state of pump 96d as well as the open or closed state of solenoid valves 96e and 96f, warm water heated by combustion type heater 96b or warm water heated with heat exchanger 96c is circulated selectively to warm-water heater 96a.

A refrigerant circulation circuit of refrigeration cycle 98 structured including condenser 97 functioning as the heat source of evaporator 31 and heat exchanger 96c connects condenser 97, capillary 65' exterior heat exchanger 58, capillary 61, evaporator 31, and accumulator 90 in this sequence between a discharge port 56a and intake port 56b of compressor 56, together with connecting solenoid valve 65a in parallel with capillary 65' and connecting solenoid valve 62 between exterior heat exchanger 58 and accumulator 90.

According to the above-described structure, during the cooling mode, compressor 56 is operated on refrigeration cycle 98 side and along with this solenoid valve 65a is switched to the "ON" state and solenoid valve 62 is switched to the "OFF" state. Meanwhile, on combustion type heating unit 96 side, operation of combustion type heater 96b and pump 96d is stopped, and along with this solenoid valves 96e and 96f are both switched to the "OFF" state. By means of this, the supply of warm water with respect to warm-water heater 96a is stopped.

Additionally, during the heater mode utilizing combustion type heater 96b, on refrigeration cycle 98 side, compressor 56 is maintained in a stopped state, solenoid valves 65a and 62 are "OFF". While on combustion type heating unit 98 side, combustion type heater 96b and pump 96d are operated, solenoid valve 96e is switched to the "ON" state, and the solenoid valve 96f is switched to the "OFF" state. By means of this, warm water heated by combustion type heater 96b circulates sequentially from warm-water heater 96a to pump 96d, to solenoid valve 96e, and then to combustion type heater 96b.

Furthermore, during the heater mode utilizing the heat-pump function of refrigeration cycle 98, on refrigeration cycle 98 side the compressor 56, solenoid valves 65a and 62 are both switched to the "ON" state, by means of which condenser 97 is made to function as the heat source for the heat-pump cycle and exterior heat exchanger 58 is maintained in a state of functioning as an "evaporator." Meanwhile, on combustion type heating unit 96 side, pump 96d is operated with the operation of combustion type heater 96b remaining stopped, and along with this solenoid valve 96e is switched to the "OFF" state and solenoid valve 96f is switched to the "ON" state. By means of this, warm water heated by condenser 97 heat exchanger 96c circulates sequentially from warm-water heater 96a to pump 96d, to solenoid valve 96f, and then to heat exchanger 96c.

During the dehumidification mode, on refrigeration cycle 98 side, compressor 56 is operated and along with this solenoid valves 65a and 62 are both switched to the "OFF" state, by means of which condenser 97 is made to function as the heat source for the heat-pump cycle and evaporator 31 is made to demonstrate a chilling function. Meanwhile, on combustion type heating unit 96 side, pump 96d is operated with the operation of combustion type heater 96b remaining stopped, and along with this, solenoid valve 96e is switched to the "OFF" state and solenoid valve 96f is switched to the "ON" state. By means of this, warm water heated by condenser 97 at heat exchanger 96c circulates sequentially from warm-water heater 96a to pump 96d, to solenoid valve 96f, and then to heat exchanger 96c.

Consequently, during the dehumidification mode wind dehumidified and chilled by evaporator 31 is reheated by means of warm-water heater 96a and blown into the passenger compartment, but in this case as well capillary 65' is provided between exterior heat exchanger 58 and condenser 97 serving as the heating source for warm-water heater 96a. Thus, similar to the above-described third embodiment, exterior heat exchanger 58 can be considered as simply a pipe for refrigerant passage. Consequently, the temperature of condenser 97 during the dehumidification mode becomes resistant to fluctuations according to the magnitude of vehicle speed, and the temperature of the blown air after exchanging heat with warm-water heater 96a warmed by means of condenser 35 is stabilized, even when exterior heat exchanger 58 is disposed in a state receiving wind accompanying travel of the automobile, and so comfortable air conditioning can be expected.

Figure 23:
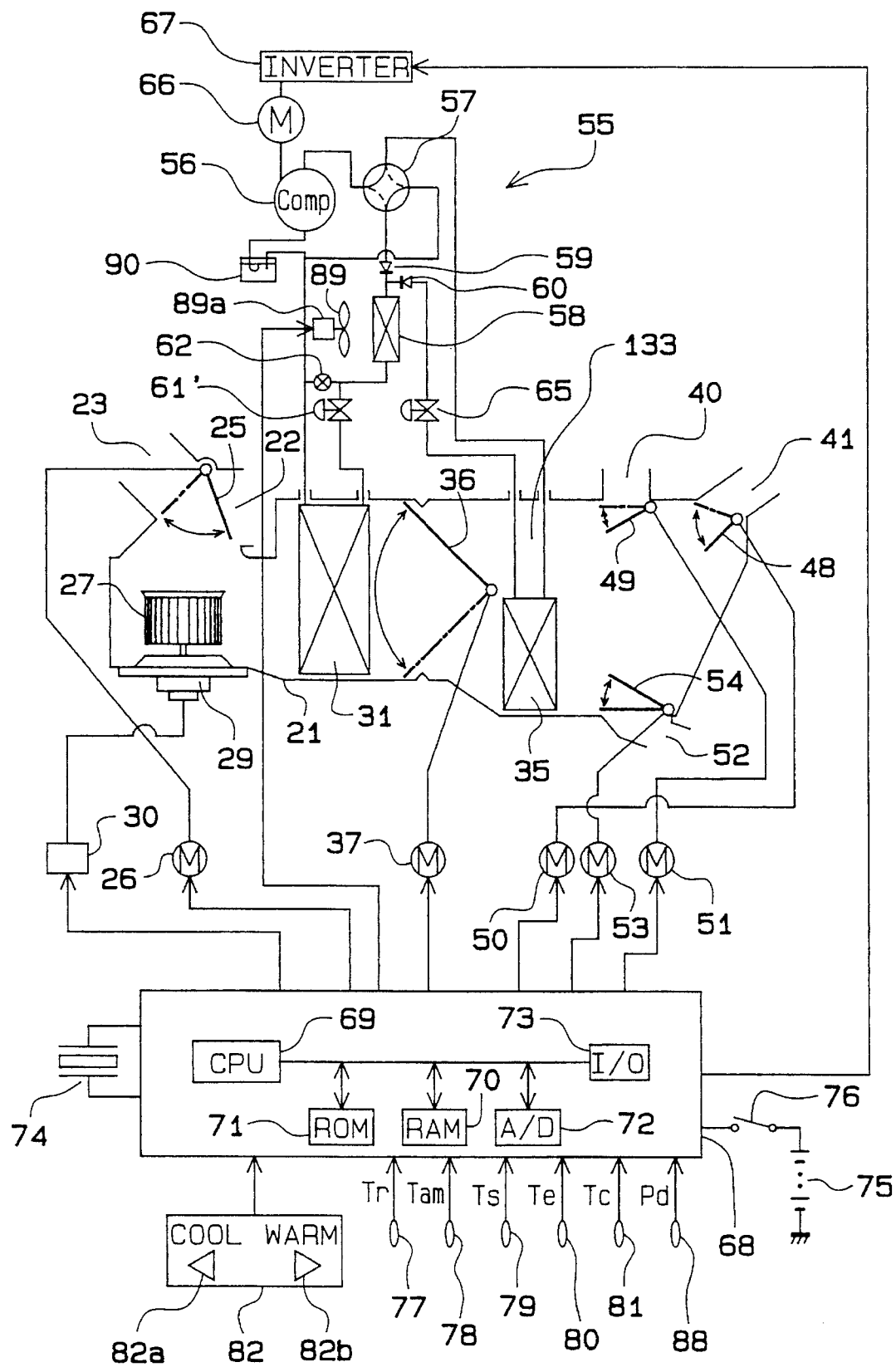
FIG. 23 is a structural schematic drawing indicating the entirety of an air-conditioning apparatus according to a sixth embodiment of this invention.

A sixth embodiment is shown in FIG. 23. This embodiment is different from the first embodiment only in a part of structure of the air-conditioning apparatus.

Outer air intake port 22, which takes in air (outer air) from outside a passenger compartment, and inner air intake port 23 which take in air (inner air) within the passenger compartment are provided at the upstream side of air duct 21. Inner/outer air damper 25 is provided at an intermediate position between inner air intake port 23 and air intake port 22. By adjusting the degree of opening of inner/outer air damper 25 using a servomotor 26, the mix ratio of air taken in from outer air intake port 22 and inner air intake ports 23 can be varied to control the intake air temperature. On the downstream side of inner/outer air damper 25, blower 27 is provided, with blower 27 being installed on a rotating shaft of blower motor 29. Blower motor 29 is driven by a drive circuit 30.

Evaporator 31 is disposed on the downstream side of blower 27. Condenser 35 is disposed at the downstream of evaporator 31 and occupies almost half cross section of duct 21 so that bypass passage 133 is set between Condenser 35 and duct 21. Air-mixing damper 36 is disposed at the downstream of evaporator 31 and at the upstream of condenser 35 to control air-mixing ratio between air flowing through condenser 35 and air flowing through bupass passage 133. Air-mixing damper 36 is driven by servomotor 37.

DEF vent 40 and FACE vent 41 are provided on the downstream end of duct 21. DEF vent 40 and FACE vent 41 are provided with respective dampers 49 and 48, and dampers 48 and 49 are driven by respective servomotors 51 and 50. FOOT vent 52 which blows air toward the feet of a passenger is provided on the downstream end of duct 21. FOOT vent 52 also includes damper 54 driven by a servomotor 53.

The evaporator 31 and condenser 35 are the constituent elements of refrigeration cycle 55 which doubles in use as a heat pump. Except electronic expansion valve 61' (FIG. 23) instead of capillary 61 (FIG. 1), a refrigerant circulation circuit of refrigeration cycle 55 is the same as that of first embodiment in FIG. 1. Refrigerant circulation circuit 55 is composed of a compressor 56, four-way switching valve 57, exterior heat exchanger 58, check valve 59, electronic expansion valve 61', solenoid valve 62, electronic expansion valve 65, accumulator 90, evaporator 31, and condenser 35 connected by piping. Electronic expansion valve 65 is provided as the first restrictor in the refrigerant passage between condenser 35 and exterior heat exchanger 58. Electronic expansion valve 61' is provided as second restrictor in the refrigerant passage between exterior heat exchanger 58 and evaporator 31. Solenoid valve 62, electronic expansion valve 65, and four-way switching valve 57 are switched as shown in the Table I in the first embodiment according to the operation mode of the refrigeration cycle 55. Since mode of operation is the same as first embodiment, explanation about mode of operation is omitted.

Additionally, this invention is not exclusively limited to the various above-described embodiments, but can be modified or expanded as will be described hereinafter.

Evaporator target exit temperature Teo is calculated so as to satisfy the intake air temperature Tin-15° C. and also 3° C. or over, but it is also acceptable to cause evaporator target exit temperature Teo to change in accordance with the ambient air temperature and passenger compartment humidity.

Furthermore, automatic switching of the operation when there is DEF input has been described, but it is also acceptable to perform automatic switching of the operation mode as according to the foregoing embodiments not with DEF input but rather when for example a dehumidification switch or automatic air conditioner switch has been switched on.

In step 155 (FIG. 4), quantity of blown air VAO is set at a fixed value, for example 300 m³/h, when during DEF, but it is also acceptable to cause this quantity of blown air VAO to change in accordance with required quantity of heat QAO or the like. Simultaneously, it is also acceptable to cause the degree of opening of inner/outer air damper 25 determined in step 165 to change without being fixed to the ambient air mode.

According to the second embodiment, the combination of valve openings of electronic expansion valves 61' and 65 is corrected on the basis of the condenser exit temperature Tc, which corresponds to information indicating the blowing temperature from air duct 21, but a structure which performs correction on the basis of other information which correlates with the actual blowing temperature is also acceptable. A structure which utilizes combustion type heating unit 96 employed according to the fifth embodiment as a heater source according to the first and second embodiments is also acceptable.

Figure 12B:
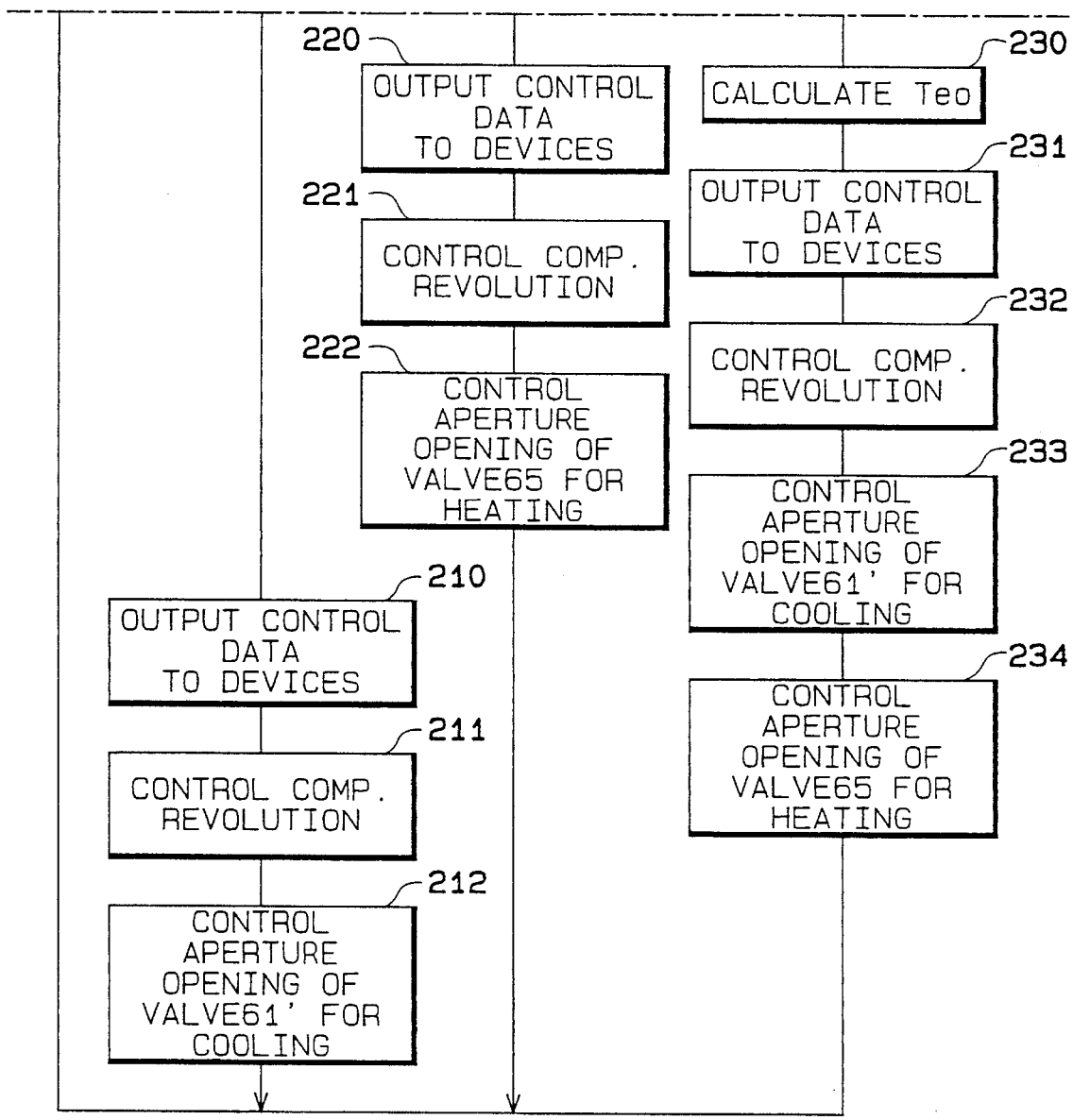
FIG. 12 consists of FIGS. 12A and 12B which together show a flowchart of a control program.

Furthermore, a structure which achieves the content of control of the various steps indicated in FIGS. 4, 12, and 13 by independent circuit means is also acceptable. Additionally, the implementation target is not exclusively limited to an air-conditioning apparatus for an electric vehicle, and it is also acceptable to perform implementation and embodiment in various types of air-conditioning apparatuses such as an air-conditioning apparatus for an engine-driven vehicle, an air-conditioning apparatus for a dwelling, and the like.

As has been made clear in the foregoing description, an air-conditioning apparatus according to this invention which switches an operation mode to either cooling, heater, or dehumidification by means of providing a first restrictor in a refrigerant passage between a condenser and an exterior heat exchanger, providing a second restrictor in a refrigerant passage between the exterior heat exchanger and an evaporator, and switching a valve provided in a refrigerant circulation circuit to switch a circulation path of refrigerant, is structured so as to cause refrigerant to flow sequentially from the condenser through the first restrictor, through the exterior heat exchanger, through the second restrictor, and then to the evaporator when in the dehumidification mode, and so a state of fluctuation in blowing temperature due to the magnitude of vehicle speed during the dehumidification mode can effectively be prevented and constantly comfortable air-conditioning operation can be performed, even in a case of mounting with respect to a vehicle in a state such that wind accompanying the travel thereof exerts an effect on the heat-radiating system of the foregoing refrigerant circulation circuit.

Additionally, in the case where the first restrictor and second restrictor are both formed by means of a fixed aperture, the structure of these restrictors can be simplified and contribution to reduction of production cost can be made, and along with this, the number of movable portions can be reduced and reliability with respect to service life can be enhanced.

Furthermore, if structured so that temperature adjustment of blown air during the dehumidification is performed by means of adjusting the aperture opening of the first restrictor provided between the condenser and the exterior heat exchanger, the heat-radiating capacity of the condenser and the heat-absorbing capacity of the evaporator can be adjusted within a comparatively wide range, and so the temperature adjustment range of the blown air when in the dehumidification mode can be expanded, and temperature control when in the dehumidification mode can be enhanced.

In this case, if made so as to control the revolving speed of the compressor along with the aperture opening of the first restrictor when in the dehumidification mode, the refrigerant discharge pressure of the compressor can also be adjusted, the temperature of the condenser can be controlled such that the temperature of the blown air assumes the target blowing temperature while controlling the temperature of the evaporator such that sufficient dehumidification capacity is assured within a range where there is no excessive cooling, and comfort during the dehumidification can be further enhanced.

Additionally, if structured so that the foregoing first restrictor and second restrictor provided in the respective refrigerant passages between the condenser and the exterior heat exchanger and between the exterior heat exchanger and the evaporator are both formed with a variable aperture, and along with this the combination of aperture openings of these restrictors are corrected based on information indicating blowing temperature from an air duct at each passage of a fixed time during the dehumidification mode to thereby adjust the temperature of the evaporator and the temperature of the condenser, it becomes possible to approach a blowing temperature that takes the actual blowing temperature at each passage of fixed time as the target, and it becomes possible to vastly enhance control characteristics for the blowing temperature.

What is claimed is:

1. An air-conditioning apparatus including, within a refrigerant circulation circuit:

an evaporator disposed within an air duct, a condenser functioning as a heating source for air passing through said evaporator, an exterior heat exchanger disposed outside said air duct, a first restrictor in a refrigerant passage between said condenser and said exterior heat exchanger, a second restrictor in a refrigerant passage between said exterior heat exchanger and said evaporator, and an operational mode of the air-conditioning apparatus being switchable to any one of a cooling, heater, or dehumidification mode by means of switching a valve provided in said refrigerant circulation circuit to switch a circulation path of refrigerant, wherein during dehumidification mode refrigerant flows sequentially from said condenser through said first restrictor, said exterior heat exchanger, and said second restrictor to said evaporator.

2. An air-conditioning apparatus according to claim 1, wherein said first restrictor and said second restrictor are both formed by means of a fixed aperture.

3. An air-conditioning apparatus according to claim 1, wherein said first restrictor is formed with a variable aperture, and wherein during dehumidification mode, temperature of said evaporator and temperature of said condenser can be adjusted by means of adjusting an aperture opening of said first restrictor.

4. An air-conditioning apparatus according to claim 3, further comprising a compressor disposed in said refrigeration cycle, wherein a revolving speed of said compressor provided in said refrigerant circulation circuit can be adjusted, and provided with a control means which during dehumidification mode controls an aperture opening of at least said first restrictor as well as said revolving speed of said compressor.

5. An air-conditioning apparatus according to claim 1, wherein said first restrictor and said second restrictor are both formed with a variable aperture and combinations of aperture openings of these various restrictors are established at a plurality of stages, and wherein during dehumidification mode, temperature of said evaporator and temperature of said condenser can be adjusted by means of correcting combinations of aperture openings of said first restrictor and said second restrictor based on information indicating a blowing temperature from an air duct at each passage of a fixed time.

* * * * *